(12) United States Patent
    Ohno

(10) Patent No.: US 12,608,774 B2
(45) Date of Patent: Apr. 21, 2026

(54) IMAGE PROCESSING APPARATUS, IMAGE PROCESSING METHOD AND STORAGE MEDIUM

(71) Applicant: SHIMADZU CORPORATION, Kyoto (JP)

(72) Inventor: Yoshinori Ohno, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 266 days.

(21) Appl. No.: 18/646,283

(22) Filed: Apr. 25, 2024

(65) Prior Publication Data

US 2024/0386534 A1 Nov. 21, 2024

(30) Foreign Application Priority Data

May 18, 2023 (JP) ................................. 2023-082221

(51) Int. Cl.
    *G06T 5/70* (2024.01)
    *G06T 5/20* (2006.01)
    *G06T 5/50* (2006.01)
    *G06T 5/80* (2024.01)
    (Continued)

(52) U.S. Cl.
    CPC ................. *G06T 5/70* (2024.01); *G06T 5/20* (2013.01); *G06T 5/50* (2013.01); *G06T 5/80* (2024.01); *G06T 7/215* (2017.01); *G06T 7/38* (2017.01); *G06T 2207/10016* (2013.01); (Continued)

(58) Field of Classification Search
    CPC .... G06T 5/70; G06T 5/20; G06T 5/50; G06T 5/80; G06T 7/215; G06T 7/38; G06T 2207/10016; G06T 2207/10116; G06T 2207/20221; G06T 2207/20224; G06T 2207/20081; G06T 2207/20084; G06T 2207/20182; G06T 5/60; H04N 23/951; H04N 23/30; H04N 23/64; H04N 23/81
    See application file for complete search history.

(56) References Cited

U.S. PATENT DOCUMENTS

| 2016/0027160 A1* | 1/2016 | Aydin | ........................ G06T 5/50 |
| | | | 382/162 |
| 2016/0191753 A1* | 6/2016 | Jin | ............................ G06T 5/20 |
| | | | 348/607 |

(Continued)

FOREIGN PATENT DOCUMENTS

JP 2019-057866 A 4/2019

*Primary Examiner* — Wassim Mahrouka

(74) *Attorney, Agent, or Firm* — Muir Patent Law, PLLC

(57) ABSTRACT

An image processing apparatus according to this invention includes an image acquirer configured to acquire the set of frame images, and an image processor. The image processor is configured to generate, based on first and second frame images, first and second primary component images such that the primary component images each include first component having a reduced noise component, respectively, to generate a second component image including a second component that is different from the first component based on one of the two frame images, and to generate an interpolation image that corresponds to an acquisition time different from acquisition times of the two frame images based on a displacement estimated based on the first component of the two first component images and the second component image.

15 Claims, 9 Drawing Sheets

(51) Int. Cl.
  G06T 7/215          (2017.01)
  G06T 7/38           (2017.01)

(52) U.S. Cl.
  CPC .............. *G06T 2207/10116* (2013.01); *G06T 2207/20221* (2013.01); *G06T 2207/20224* (2013.01)

(56)                References Cited

U.S. PATENT DOCUMENTS

2019/0138889 A1 *   5/2019   Jiang ................... G06N 3/0455
2020/0204760 A1      6/2020   Takami et al.

* cited by examiner

*FIG.2*

(COMPARATIVE EXAMPLE)

*FIG.11*

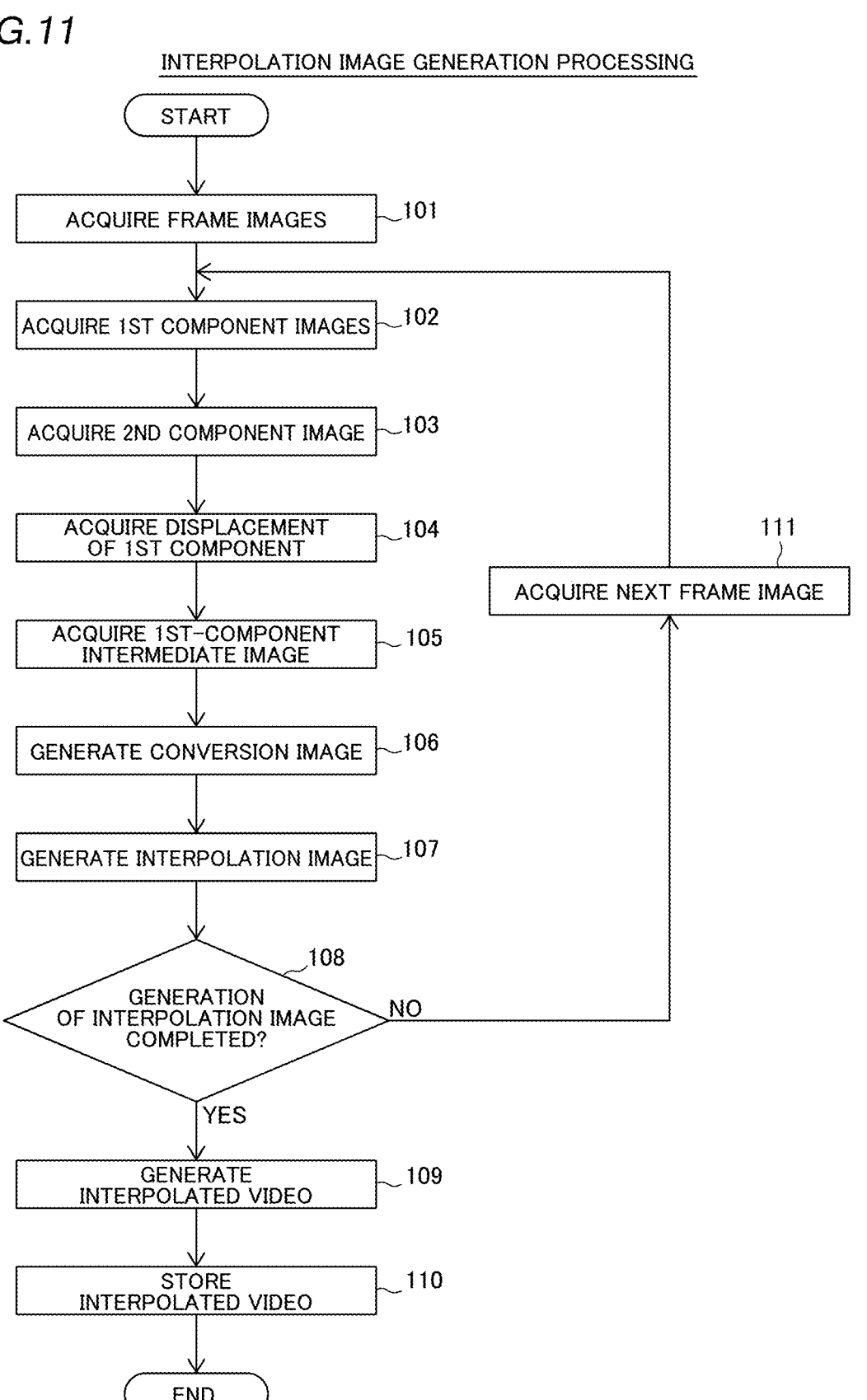

INTERPOLATION IMAGE GENERATION PROCESSING

START

ACQUIRE FRAME IMAGES ~101

ACQUIRE 1ST COMPONENT IMAGES ~102

ACQUIRE 2ND COMPONENT IMAGE ~103

ACQUIRE DISPLACEMENT OF 1ST COMPONENT ~104

ACQUIRE 1ST-COMPONENT INTERMEDIATE IMAGE ~105

GENERATE CONVERSION IMAGE ~106

GENERATE INTERPOLATION IMAGE ~107

GENERATION OF INTERPOLATION IMAGE COMPLETED? ~108    NO

ACQUIRE NEXT FRAME IMAGE ~111

YES

GENERATE INTERPOLATED VIDEO ~109

STORE INTERPOLATED VIDEO ~110

END (MODIFIED EMBODIMENT)

IMAGE PROCESSING APPARATUS, IMAGE PROCESSING METHOD AND STORAGE MEDIUM

CROSS-REFERENCE TO RELATED APPLICATIONS

The related application number JP2023-082221, image processing apparatus, image processing method and storage medium, May 18, 2023, OHNO Yoshinori, upon which this patent application is based are hereby incorporated by reference in its entirety.

BACKGROUND OF THE INVENTION

Field of the Invention

The present invention relates to an image processing apparatus, an image processing method and a storage medium, and in particular to an image processing apparatus, an image processing method and a storage medium capable of increasing the number of frame images included in a video.

Description of the Background Art

Image processing apparatuses that increase the number of frame images included in a video are known in the art. Such an image processing apparatus is disclosed in Japanese Patent Laid-Open Publication No. JP2019-57866, for example.

The above Japanese Patent Laid-Open Publication No. JP2019-57866 discloses an interpolation frame generation device including a frame memory, a motion vector detector, and a frame frequency conversion memory. In a configuration disclosed in the above Japanese Patent Laid-Open Publication No. JP2019-57866, the motion vector detector detects, based on a current frame of an input image signal and a frame one frame before the current frame generated by the frame memory, motion vectors between the frames Also, the above Japanese Patent Laid-Open Publication No. JP2019-57866 discloses a configuration that generates an interpolation frame between the current frame and the frame one frame before the current frame based on the motion vectors detected by the motion vector detector. In addition, the above Japanese Patent Laid-Open Publication No. JP2019-57866 discloses a configuration of the frame frequency conversion memory that alternately reads the current frame and the interpolation frame whereby generating an image signal having a frequency that is twice the frame frequency of the input image signal.

In a case in which the motion vectors are calculated based on a plurality of frames (a set of frame images) included the image signals, and the interpolation frame (interpolation image) is generated as disclosed in the above Japanese Patent Laid-Open Publication No. JP2019-57866, if the set of frame images includes noises, the motion vectors cannot be accurately detected. If the motion vector cannot be accurately detected, the interpolation image cannot be accurately generated.

SUMMARY OF THE INVENTION

The present invention is intended to solve the above problem, and one object of the present invention is to provide an image processing apparatus, an image processing method and a storage medium capable of accurately generating an interpolation image even in a case in which the interpolation image is generated based on a set of frame images including noises.

An image processing apparatus according to a first aspect of the present invention is an image processing apparatus for applying image processing to a set of frame images, the frame images constituting a video, the image processing apparatus including an image acquirer configured to acquire the set of frame images; and an image processor configured to apply image processing to the set of frame images acquired by the image acquirer, wherein the image processor is configured to generate, based on first and second frame images acquired at different time points in the plurality of frame images, first and second primary component images such that the primary component images each include first component having a reduced noise component, respectively, to generate a second component image including a second component that is different from the first component based on one of the two frame images, to estimate a displacement of the first component based on the two first component images, and to generate an interpolation image that corresponds to an acquisition time different from the acquisition times of the two frame images, based on the displacement of the first component between the two first component images, and the second component image.

An image processing apparatus according to a second aspect of the present invention is an image processing apparatus for applying image processing to a set of frame images, the frame images constituting a video of radiographic images, the image processing apparatus including an image acquirer configured to acquire the radiographic images as the video; and an image processor configured to apply image processing to the radiographic images acquired by the image acquirer, wherein the image processor is configured to generate, based on first and second frame images acquired at different time points in the set of frame images included in the radiographic images, first and second primary component images such that the primary component images each include first component having a reduced noise component, respectively, to generate a second component image including a second component that is different from the first component based on one of the two frame images, to estimate a displacement of the first component based on the two first component images, and to generate a radiographic interpolation image that is a radiographic image corresponding to an acquisition time different from the acquisition times of the two frame images, based on the displacement of the first component between the two first component images, and the second component image.

An image processing method according to a third aspect of the present invention is an image processing method for applying image processing to a set of frame images, the frame images constituting a video, the image processing method including a step of generating, based on first and second frame images acquired at different time points in the set of frame images included in the radiographic images, first and second primary component images such that the primary component images each include first component having a reduced noise component, respectively, a step of generating a second component image including a second component that is different from the first component based on one of the two frame images; a step of estimating a displacement of the first component based on the two first component images; and a step of generating an interpolation image that corresponds to an acquisition time different from the acquisition times of the two frame images, based on the displacement of the first component between the two first component images, and the second component image.

A storage medium according to a fourth aspect of the present invention is a storage medium storing an image processing program to be executed in an image processing apparatus for applying image processing to a set of frame images, the frame images constituting a video, the image processing program causing the image processing apparatus to perform a process of generating, based on first and second frame images acquired at different time points in the set of frame images included in the radiographic images, first and second primary component images such that the primary component images each include first component having a reduced noise component, respectively; a process of generating a second component image including a second component that is different from the first component based on one of the two frame images; a process of estimating a displacement of the first component based on the two first component images; and a process of generating an interpolation image that corresponds to an acquisition time different from the acquisition times of the two frame images, based on the displacement of the first component between the two first component images, and the second component image.

In the image processing apparatus according to the first aspect, the image processing method according to the third aspect, and the storage medium according to the fourth aspect of the present invention, first component images that include a first component whose noises are reduced are acquired from two frame images that correspond to different acquisition times in a set of frame images, and a second component image that includes a second component different from the first component is acquired based on one of the two frame images. In addition, a displacement of the first component is estimated based on the two first component images, and an interpolation image that corresponds to an acquisition time different from the acquisition times of the two frame images is generated based on the displacement of the first component between the two first component images, and the second component image. Because the displacement of the first component is estimated based on the first component images whose noises are reduced, it is possible to accurately estimate the displacement of the first component as compared with a configuration in which a displacement of the first component is estimated based on images whose noises are not reduced. Accordingly, because the displacement of the first component can be accurately estimated, it is possible to improve accuracy of the interpolation image generated based on the displacement of the first component between the two first component images, and the second component image. Consequently, it is possible to provide an image processing apparatus, an image processing method and a storage medium capable of accurately generating an interpolation image even in a case in which the interpolation image is generated based on a set of frame images including noises.

Also, the image processing apparatus according to the second aspect of the present invention includes the image processor configured to acquire first component images each of which is acquired from corresponding one of two frame images that correspond to different acquisition times in the set of frame images included in the radiographic images and each of which includes a first component whose noises are reduced, to generate a second component image including a second component that is different from the first component based on one of the two frame images, to estimate a displacement of the first component based on the two first component images, and to generate a radiographic interpolation image that is a radiographic image corresponding to an acquisition time different from the acquisition times of the two frame images, based on the displacement of the first component between the two first component images, and the second component image. Here, in a case in which a video of radiographic images is captured, in order to reduce a radiation dosage, radiation intensity is reduced. In this case, an SN ratio (signal-to-noise ratio) of a radiographic image is reduced, and as a result the image includes a larger amount of noise. To address this, according to the aforementioned configuration, the displacement of the first component is estimated based on the first component images, which are acquired from radiographic images and whose noises are reduced, and as a result it is possible to accurately estimate the displacement of the first component as compared with a configuration in which a displacement of the first component is estimated based on radiographic images whose noises are not reduced. Accordingly, because the displacement of the first component can be accurately estimated, it is possible to improve accuracy of the radiographic interpolation image generated based on the displacement of the first component between the two first component images, and the second component image. For this reason, because the total number of imaging shots using radiofrequency irradiation can be reduced by partial-shot-omission imaging while reducing radiation intensity in order to reduce a radiation dosage, it is possible to provide an image processing apparatus capable of improving accuracy of the radiation interpolation image while reducing the radiation dosage. Here, the partial-shot-omission imaging refers to imaging that increases a time interval between frame images to be captured in which imaging using radiofrequency irradiation is not performed with respect to a time interval corresponding to a typical frame rate. As a result, a video having a frame rate lower than the typical frame rate is captured in the partial-shot-omission imaging.

BRIEF DESCRIPTION OF THE DRAWINGS

FIG. 2 is a schematic view showing the configuration of the X-ray imaging apparatus for capturing frame images to which image processing is applied by the image processing apparatus according to the one embodiment.

FIG. 11 is a flowchart illustrating processing for storing the interpolated moving image including the interpolation images by using the image processor according to the one embodiment.

DESCRIPTION OF THE PREFERRED EMBODIMENT

Embodiments embodying the present invention will be described with reference to the drawings.

Figure 1:
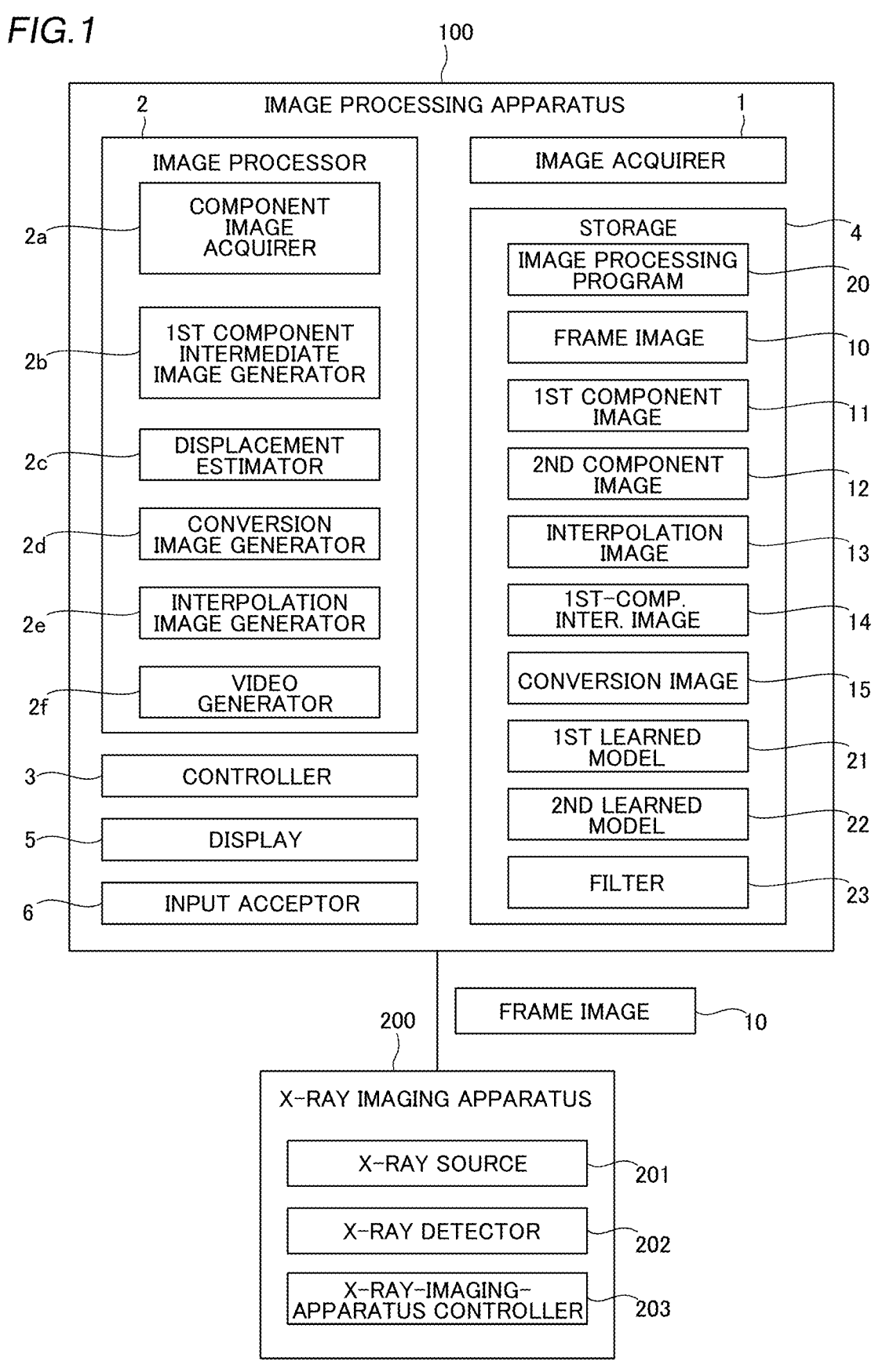
FIG. 1 is a block diagram showing a configuration of an image processing apparatus according to one embodiment, and a configuration of an X-ray imaging apparatus for capturing frame images to which image processing is applied by the image processing apparatus.

As shown in FIG. 1, an image processing apparatus 100 includes an image acquirer 1, and an image processor 2. In addition, the image processing apparatus 100 includes a controller 3, a storage 4, and a display 5, and an input acceptor 6. The image processing apparatus 100 is an image processing apparatus for applying image processing to a set of frame images 10, the frame images constituting a video input from an X-ray imaging apparatus 200. The frame images 10 include radiographic images. In this embodiment, the frame images 10 are radiographic images in a video captured at a predetermined frame rate. The predetermined frame rate is 7.5 fps (frame per second), for example. The radiographic images are, for example, X-ray images.

The image acquirer 1 is configured to acquire frame images 10. The image acquirer 1 is an input/output interface, for example.

The image processor 2 is configured to apply image processing to the frame images 10 acquired by the image acquirer 1. The image processor 2 is constructed of a processor, such as a CPU (Central Processing Unit) or an FPGA (Field-Programmable Gate Array), or circuitry, and a memories, such as a ROM (Read Only Memory) and a RAM (Random Access Memory).

The image processor 2 includes a component image acquirer 2a, a first component intermediate image generator 2b, a displacement estimator 2c, a conversion image generator 2d, an interpolation image generator 2e, and a moving-image generator 2f as functional blocks. The component image acquirer 2a, the first component intermediate image generator 2b, the displacement estimator 2c, the conversion image generator 2d, the interpolation image generator 2e, and the moving-image generator 2f are constructed of the functional blocks as software realized by executing an image processing program 20 stored in the storage 4 by the image processor 2. Alternatively, the component image acquirer 2a, the first component intermediate image generator 2b, the displacement estimator 2c, the conversion image generator 2d, the interpolation image generator 2e, and the moving-image generator 2f can be constructed of dedicated processors (processing circuits) as hardware that are provided separately from each other. Functions of the component image acquirer 2a, the first component intermediate image generator 2b, the displacement estimator 2c, the conversion image generator 2d, the interpolation image generator 2e, and the moving-image generator 2f will be described later.

The controller 3 is configured to control parts of the image processing apparatus 100 by executing various programs (not shown) stored in the storage 4. The controller 3 is constructed of a processor, such as a CPU, or circuitry, and memories, such as a ROM and a RAM.

The storage 4 is configured to store the image processing program 20. Also, the storage 4 is configured to store frame images 10, first component images 11, second component images 12, interpolation images 13, first-component intermediate images 14, and conversion images 15, which will be described later. Also, the storage 4 is configured to first and second learned models 21 and 22, which will be described later. Also, the storage 4 is configured to store a filter 23 to be used for filtering described later. Also, the storage 4 is configured to various programs executed by the controller 3. The storage 4 includes a nonvolatile storage, such as an HDD (Hard Disk Drive) or an SSD (Solid State Drive), for example. The interpolation images 13 are examples of a "radiological interpolation image" in the claims. The storage 4 is an example of a "storage medium" in the claims.

The image processing program 20 is an image processing program to be executed in the image processing apparatus 100 (image processor 2) for applying image processing to a set of frame images 10, the frame images constituting a video. The image processing applied to images by executing the image processing program 20 by the image processor 2 will be described later.

The display 5 is configured to display the video generated by the image processor 2. For example, the display 5 is a display device such as an LCD monitor or an organic EL (Electro Luminescence) monitor.

The input acceptor 6 is configured to accept operating inputs from a user. The input acceptor 6 includes input devices, such as a computer mouse, keyboard, etc., for example.

Figure 2:
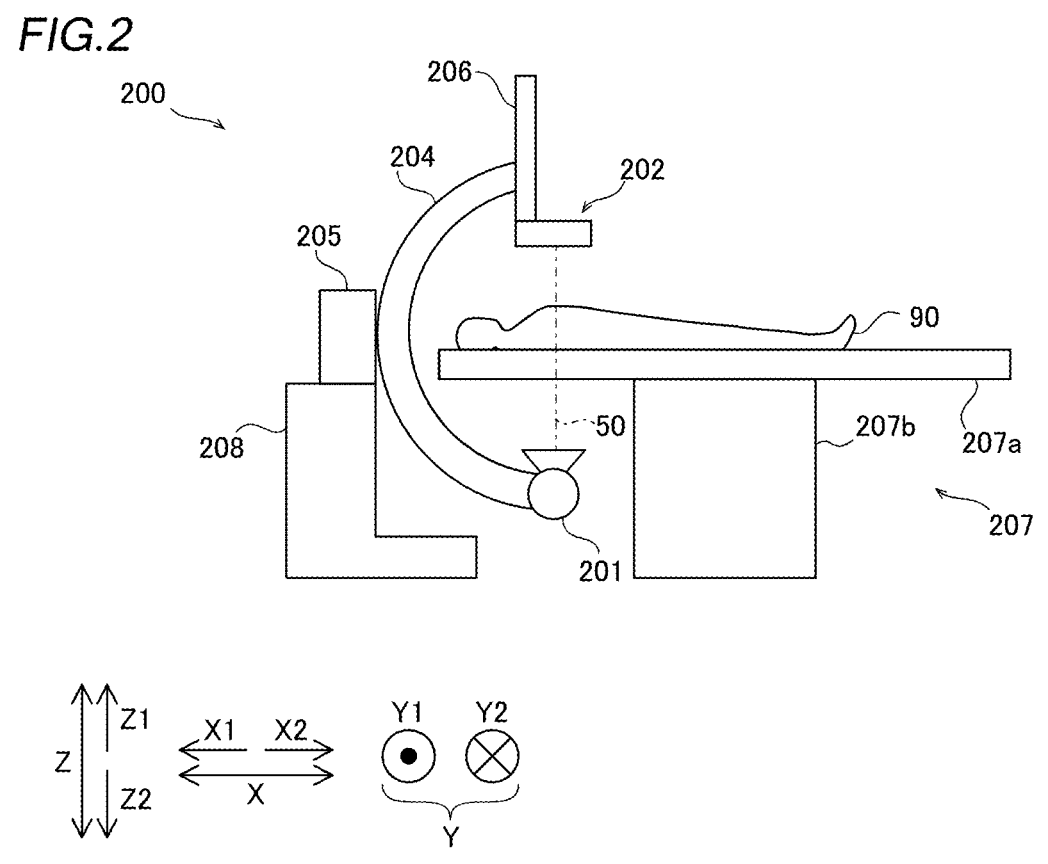

The X-ray imaging apparatus 200 is configured to capture X-ray image, which is a video to be shown to an operator such as a doctor in treatment using a catheter 91 (see FIG. 4) on a subject 90 (see FIG. 2). The X-ray imaging apparatus 200 includes an X-ray source 201, an X-ray detector 202, and an X-ray-imaging-apparatus controller 203.

The X-ray source 201 is configured to irradiate the subject 90 with X-rays (see FIG. 2). The X-ray source 201 includes an X-ray generator, such as an X-ray tube.

The X-ray detector 202 is configured to detect X-rays with which the subject is irradiated by the X-ray source 201. The X-ray detector 202, for example, is a flat panel detector (FPD) configured detect X-rays passing through the subject 90.

The X-ray-imaging-apparatus controller 203 is configured to control various parts of the X-ray imaging apparatus 200. Specifically, the X-ray-imaging-apparatus controller 203 is configured to control X-ray irradiation by the X-ray source 201, such as start and stop of X-ray irradiation, and to control detection by the X-ray detector 202. The X-ray-imaging-apparatus controller 203 is constructed of a processor, such as a CPU, FPGA, or circuitry, and memories, such as a ROM and a RAM.

(Configuration of X-Ray Imaging Apparatus)

As shown in FIG. 2, the X-ray source 201 is held on one end part of an arm 204, and faces the X-ray detector 202. According to this arrangement, in this embodiment, X-rays emitted from the X-ray source 201 are directed to the X-ray detector 202. In this embodiment, the arm 204 is arranged so that a top plate 207a is interposed between the X-ray source 201 and the X-ray detector 202. Accordingly, the X-ray source 201 is configured to irradiate the subject 90 with X-rays. An upward/downward direction is defined as a Z direction, and upward and downward directions are defined as Z1 and Z2 directions, respectively, in a schematic view of FIG. 2 showing an exemplary configuration of the X-ray imaging apparatus. Two directions orthogonal to each other in a horizontal plane orthogonal to the Z-direction are defined as X and Y directions. One direction is defined as a X1 direction, and another direction is defined as a X2 direction in the X direction. One direction is defined as a Y1 direction, and another direction is defined as a Y2 direction in the Y direction.

The X-ray detector 202 is held on the another direction side of the arm 204, and faces the X-ray source 201. According to this arrangement, the X-ray detector 202 is configured to detect X-rays with which the subject is irradiated by the X-ray source 201.

The arm 204 is configured to hold the X-ray source 201 and the X-ray detector 202. In this embodiment, the arm 204 has an arc-like shape, and the X-ray source 201 and the X-ray detector 202 are held on one end and another end of the arm, respectively. The arm 204 is a so-called C-arm.

The arm drive mechanism 205 is configured to drive the arm 204. The arm 204 is configured to be driven by the arm drive mechanism 205 so as to position the X-ray source 201 and the X-ray detector 202 at various positions.

The X-ray-detector moving mechanism 206 is arranged on the arm 204, and is configured to move the X-ray detector 202 forward or backward in a direction of an X-ray irradiation axis 50. For example, the X-ray-detector moving mechanism 206 includes a translation mechanism.

A bed 207 is configured to allow the subject 90 to lie on the bed. The bed 207 includes the top plate 207a, and a top-plate moving mechanism 207b. The subject 90 can lie on the top plate 207a.

The top-plate moving mechanism 207b is configured to move the top plate 207a in the Z direction. In addition, the top-plate moving mechanism 207b is configured to translate the top plate 207a in an X-Y plane. The top-plate moving mechanism 207b includes a linear motion mechanism configured to move the top plate 207a in the X direction, a linear motion mechanism configured to move the top plate 207a in the Y direction, and a linear motion mechanism configured to move the top plate 207a in the Z direction, for example.

An arm-position changing mechanism 208 is configured to move the arm drive mechanism 205 so as to move the arm 204 to a desired imaging position together with the arm drive mechanism 205. Accordingly, the X-ray imaging apparatus 200 can capture images of the subject 90 from various imaging positions.

(Capture of Moving Image in Comparative Example)

Figure 3:
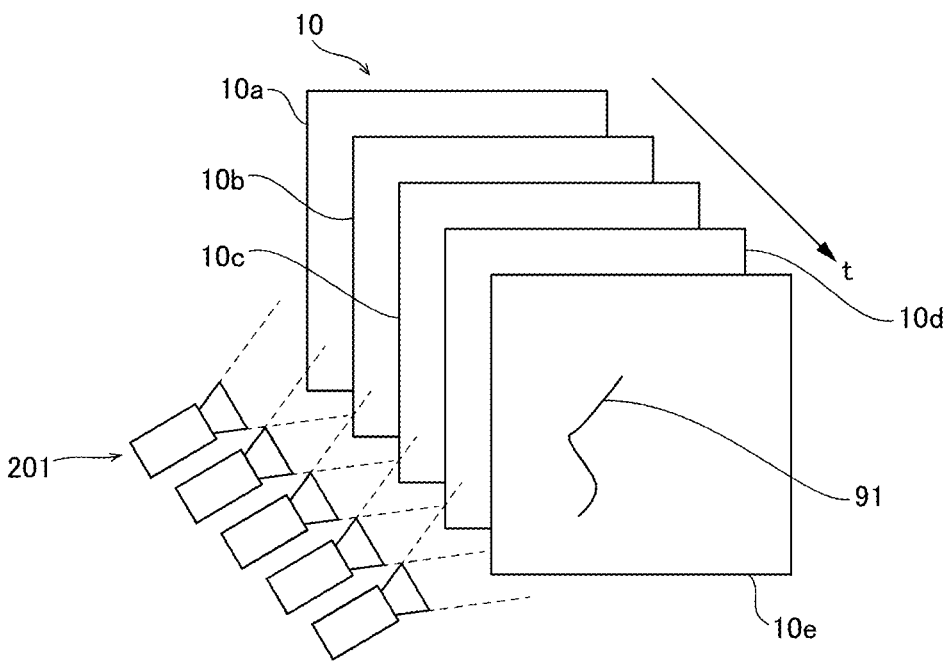
FIG. 3 is a schematic diagram showing a configuration for capturing a video according to a comparative example.

Capture of a video in a comparative example is described with reference to FIG. 3. In the comparative example shown in FIG. 3, five images of first to fifth frame images 10a to 10e are captured as frame images 10 at a predetermined frame rate. The predetermined frame rate is 7.5 fps, for example. In an exemplary moving-image capture shown in FIG. 3, frame images 10 corresponding to their image capture times are aligned side by side. The first frame image 10a is the earliest frame image 10, and the fifth frame image 10e is the latest frame image 10. In the exemplary moving-image capture shown in FIG. 3, each frame image 10 includes a catheter 91.

In the comparative example, the X-ray source 201 irradiates the subject with X-rays when the first frame image 10a, the second frame image 10b, the third frame image 10c, the fourth frame image 10d, and the fifth frame image 10e are captured. For this reason, a radiation dosage for the subject 90 (see FIG. 2) becomes larger so that the number of X-ray imaging shots becomes larger as the frame rate at which the frame images 10 are captured is higher.

Capture of Moving Image in this Embodiment

Figure 4:
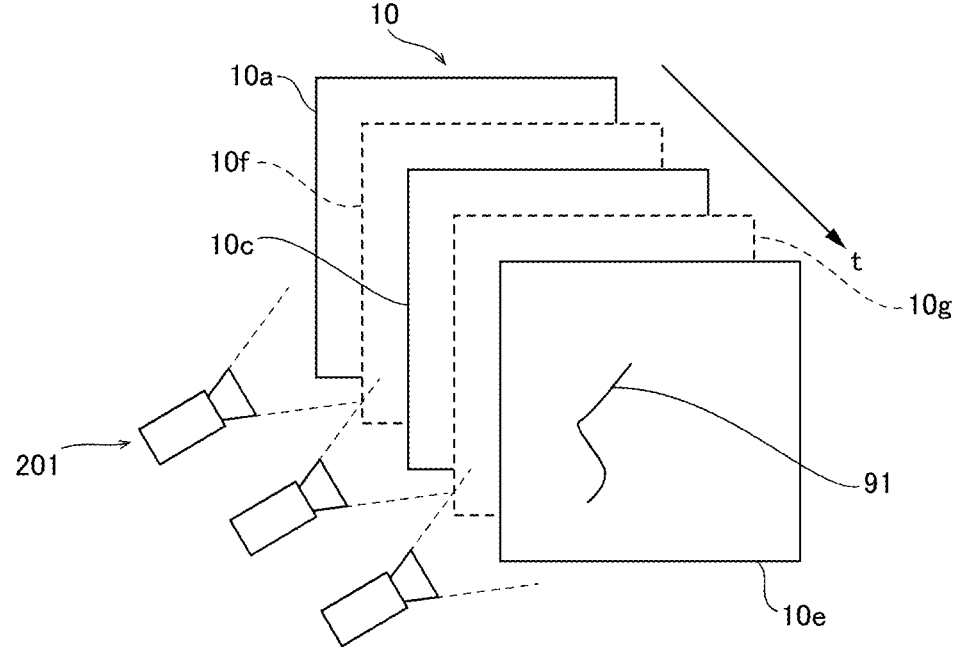
FIG. 4 is a schematic diagram showing a configuration for capturing a video according to the one embodiment.

To address this, in this embodiment, in order to reduce the radiation dosage for the subject 90, some of shots are omitted (partial-shot-omission imaging) as shown in FIG. 4. The partial-shot-omission imaging refers to imaging that does not irradiate the subject with X-rays every when the first frame image 10a to the fifth frame image 10e are captured at the predetermined frame rate but increases a time interval between frame images 10 to be captured in which imaging using X-ray irradiation is not performed with respect to a time interval corresponding to the predetermined frame rate. In an exemplary moving-image capture shown in FIG. 4, frame images 10 corresponding to their image capture times are also aligned side by side. Also, in the exemplary moving-image capture shown in FIG. 4, the first frame image 10a is the earliest frame image 10, and the fifth frame image 10e is the latest frame image 10.

In the exemplary moving-image capture shown in FIG. 4, the X-ray source irradiates the subject with X-rays when the first frame image 10a, the third frame image 10c, and the fifth frame image 10e are captured. The X-ray source does not irradiate the subject with X-rays at timing corresponding to a first frame 10f between the first frame image 10a and the third frame image 10c, and timing corresponding to a second frame 10g between the third frame image 10c and the fifth frame image 10e. Accordingly, the radiation dosage for the subject 90 (see FIG. 2) can be reduced. In FIG. 4, although the first frame 10f and the second frame 10g are shown by dashed lines for convenience, images of the subject are not captured at these frames because the X-ray source does not irradiate the subject with X-rays.

In a case of partial-shot-omission imaging, because the subject is not irradiated with X-rays in some of frames, the video of images captured has a frame rate lower than the predetermined frame rate. In this case, the video displayed on the display 5 (see FIG. 1) is not smooth, and as a result an operator may have a trouble in treatment on the subject 90 (see FIG. 2).

For this reason, in this embodiment, the image processor 2 (see FIG. 1) is configured to omit some of shots, and to interpolate interpolation images into the video of the frame images 10 to be output so as to adjust a frame rate of the video to the predetermined frame rate.

Specifically, the image processor 2 is configured to generate interpolation images 13 (see FIG. 5), and to interpolate the interpolation images into the video of the frame images 10. In this embodiment, the image processor 2 is configured to generate an interpolation image 13 by using motion vectors 30a (see FIG. 5), or to generate an interpolation image 13 by using the first learned model 21 (see FIG. 6).

(Generation of Interpolation Image Using Motion Vectors)

Figure 5:
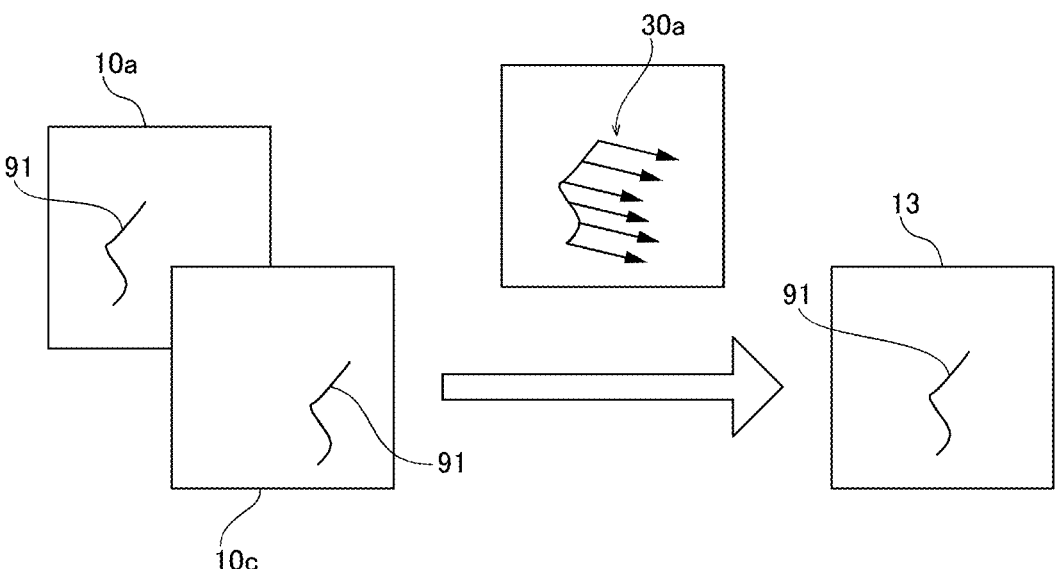
FIG. 5 is a schematic diagram illustrating a configuration in which an interpolation image is generated by using motion vectors by an image processor according to the one embodiment.

A configuration of the image processor 2 (see FIG. 1) that generates an interpolation image 13 using motion vectors 30a is first described with reference to FIG. 5. In the exemplary configuration shown in FIG. 5, the image processor 2 generates, from the first frame image 10a and the third frame image 10c, the interpolation image 13 corresponding to a frame (first frame 10f (see FIG. 4)) between the first frame image 10a and the third frame image 10c.

The image processor 2 acquires the motion vectors 30a of a catheter 91 from the first frame image 10a and the third frame image 10c. Specifically, the image processor 2 specifies a plurality of feature points of the catheter 91, and acquires the motion vectors 30a corresponding to the feature points based on positions of the feature points in each frame image 10. In other words, the image processor 2 acquires the motion vectors 30a by using the Lucas-Kanade method. Alternatively, the image processor 2 can be configured to acquire the motion vectors 30a by using template matching.

The image processor 2 is configured to generate the interpolation image 13 based on the catheter 91 included in the first frame image 10a or the catheter 91 included in the third frame image 10c, and the motion vectors 30a acquired. For example, as shown in FIG. 5, in a case in which the interpolation image 13 is generated as a frame image 10 between the first frame image 10a and the third frame image 10c, the interpolation image 13 is generated by using motion vectors that are the same same direction as the motion vectors 30a acquired based on the first frame image 10a and the third frame image 10c and have ½ sizes of the motion vectors 30a. The sizes of the motion vectors 30a in the generation of the interpolation image 13 are specified according to a position (time order) of an interpolation image 13 to be inserted and the number of interpolation images 13 to be inserted. For example, in a case in which two interpolation images 13 are inserted between the first frame image 10a and the third frame image 10c, the sizes of the motion vectors 30a are specified to ⅓ sizes of the motion vectors 30a when generating an interpolation image 13 to be inserted on a first frame image 10a side (in time order). In this case, the sizes of the motion vectors 30a are specified to ⅔ sizes of the motion vectors 30a when generating an interpolation image 13 to be inserted on a third frame image 10c side.

(Generation of Interpolation Image Using Learned Model)

Figure 6:
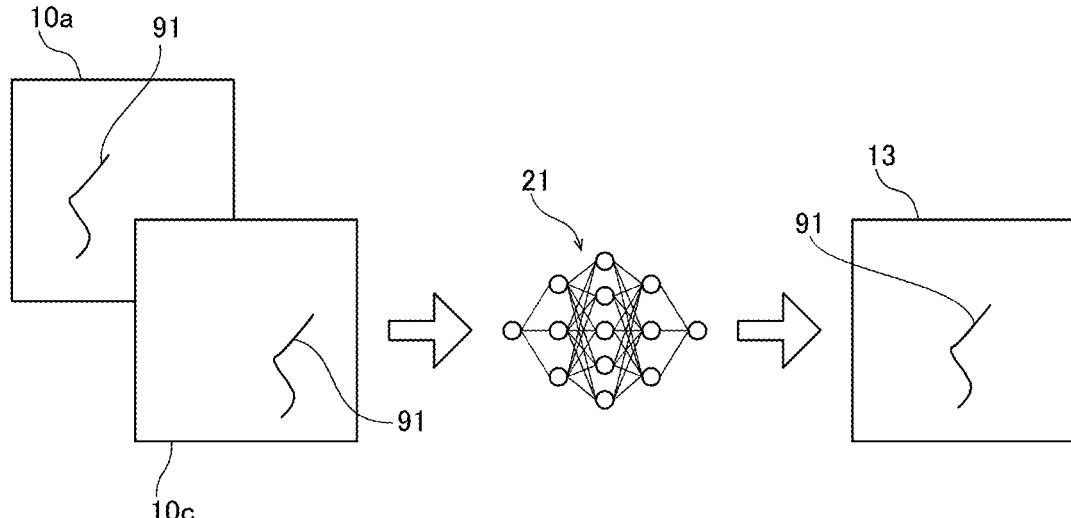
FIG. 6 is a schematic diagram illustrating a configuration in which the interpolation image is generated by using a first learned model by the image processor according to the one embodiment.

A configuration of the image processor 2 (see FIG. 1) that generates an interpolation image 13 using the first learned model 21 is now described with reference to FIG. 6. In the exemplary configuration shown in FIG. 6, the image processor 2 also generates, from the first frame image 10a and the third frame image 10c, the interpolation image 13 corresponding to a frame (first frame 10f (see FIG. 4)) between the first frame image 10a and the third frame image 10c.

The first learned model 21 is produced, for example, by training a convolutional neural network (CNN) or a learning model including a convolutional neural network. Specifically, the first learned model 21 is produced by training the first learned model 21 to learn to generate, based on a plurality of images, images that include an image component displaced. In the production of the first learned model 21, in order to accurately estimate a displacement of the image component displaced by respirations and/or heartbeats of the subject 90 (FIG. 2), images a frame rate of which is sufficiently small as compared with the respirations and/or the heartbeats of the subject 90 are used as moving images for training the first learned model 21. Here, the term that a frame rate of images is sufficiently small as compared with the respirations and/or the heartbeats of the subject 90 refers to that one frame image does not include two or more phases of respirations and/or heartbeats of the subject 90.

The image processor 2 can generate the interpolation image 13, which is a frame image 10 between the first frame image 10a and the third frame image 10c by inputting the first frame image 10a and the third frame image 10c, which include the catheter 91, into the first learned model 21.

In a case in which images of the subject 90 are captured by using X-rays, in order to reduce an amount of exposure of the subject 90 to the X-rays, a dose of X-rays with which the X-ray source 201 (see FIG. 1) irradiates the subject with X-rays set as low as possible as long as the subject 90 can be imaged. In this case, an SN ratio decreases, and the frame images 10 will include noises. Also, both in a configuration in which the image processor 2 is configured to generate the interpolation image 13 by using the motion vectors 30a (see FIG. 5), and a configuration in which the image processor 2 is configured to generate the interpolation image 13 by using the first learned model 21, if the frame images 10 include noises, accuracy of the interpolation image 13 is reduced. Specifically, in the configuration in which the image processor 2 is configured to generate the interpolation image 13 by using the motion vectors 30a, the accuracy of the motion vectors 30a will be reduced because the noises make it difficult to accurately acquire displacements of the feature points of the catheter 91. For this reason, accuracy of the interpolation image 13 generated will be reduced. Also, in the configuration in which the image processor 2 is configured to generate the interpolation image 13 by using the first learned model 21, the accuracy of the interpolation image 13 will be reduced because the noises cause artifacts that will appear in the interpolation image 13 generated.

(Generation of Interpolation Image and Generation of Interpolated Moving Image)

To address this problem, in this embodiment, the image processor 2 is configured to suppress the reduction accuracy of the interpolation image 13 even if frame images 10 include noises. A configuration of the image processor 2 (see FIG. 1) that generates an interpolation image 13 based on frame images 10 that include noises is described with reference to FIGS. 7 to 10.

Figure 7:
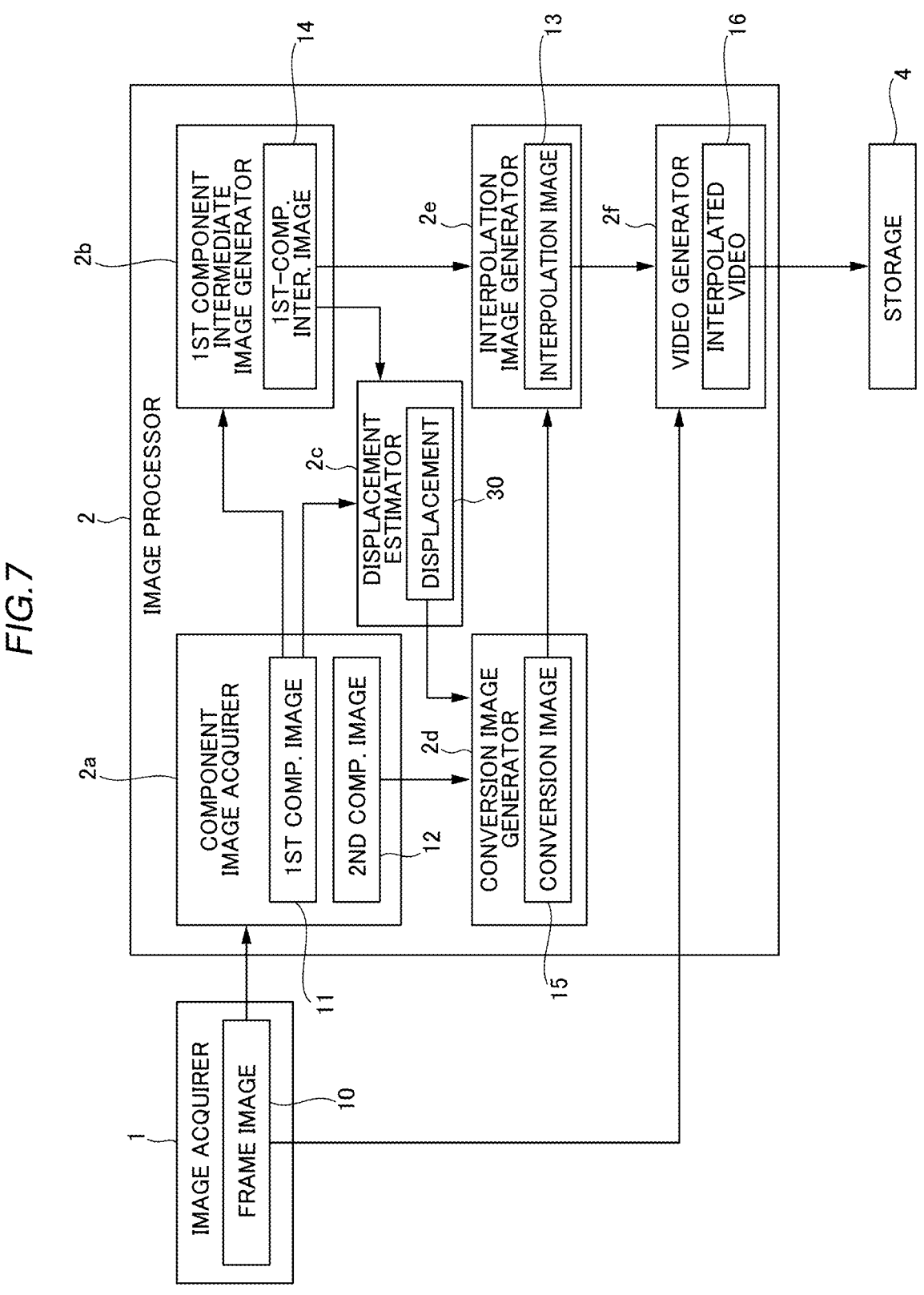
FIG. 7 is a schematic diagram illustrating a configuration in which the interpolation image is generated the image processor according to the one embodiment, and an interpolated moving image that includes interpolation images is stored.

As shown in FIG. 7, the component image acquirer 2a is configured to acquire the frame images 10 from the image acquirer 1. The component image acquirer 2a acquires a first component image 11 and a second component image 12 based on the frame images 10. In this embodiment, the component image acquirer 2a is configured to acquire the first component image 11 and the second component image 12 based on a radiographic image, which is a video.

(Acquisition of First and Second Component Images)

Figure 8:
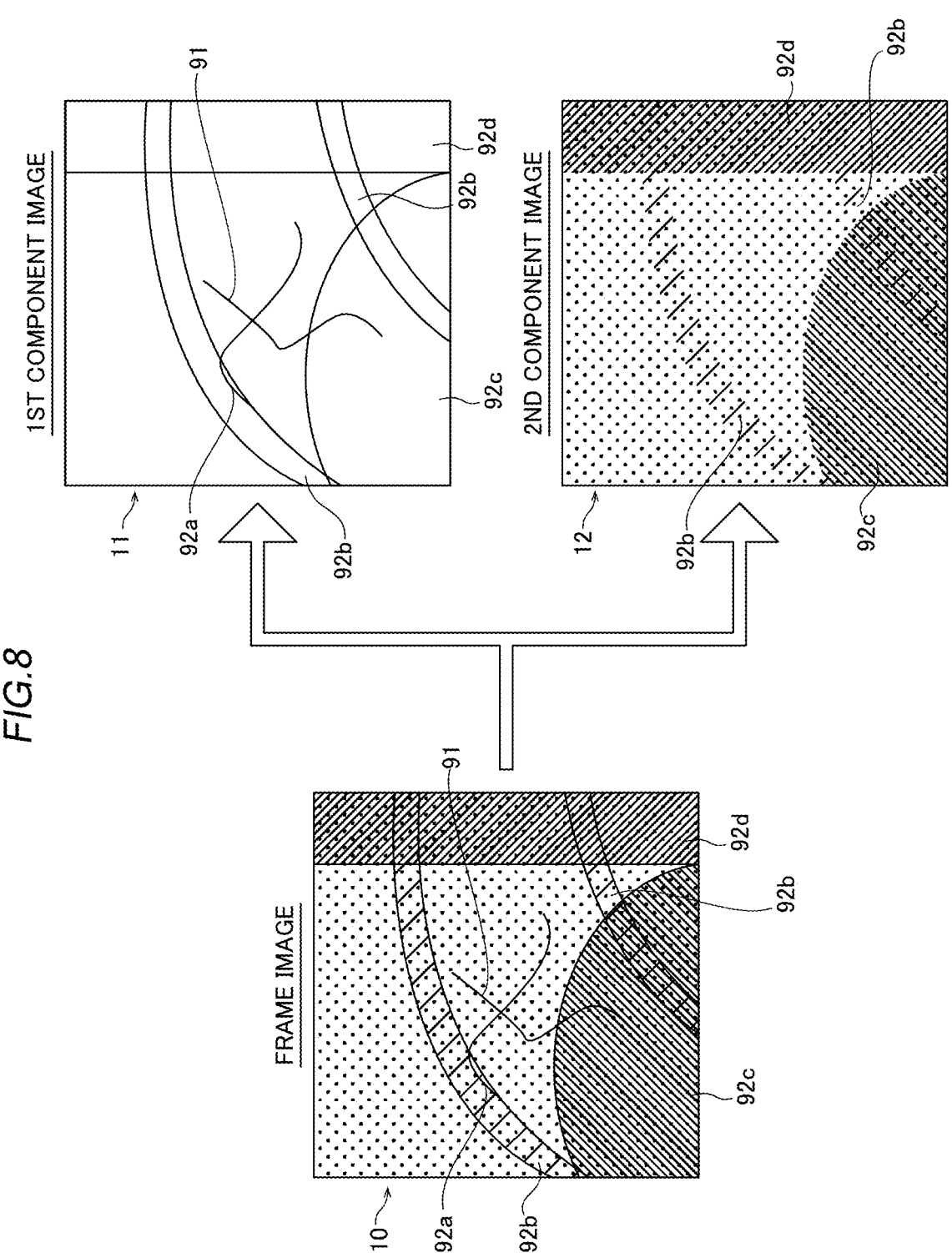
FIG. 8 is a schematic diagram illustrating a configuration in which first and second component images are generated from a frame image by the image processor according to the one embodiment.

The following description describes a configuration in which the component image acquirer 2a (see FIG. 7) acquires a first component image 11 and a second component image 12 based on the frame image 10 with reference to FIG. 8. In an exemplary configuration shown in FIG. 8, the frame image 10 is an X-ray image that includes the catheter 91, a vessel 92a, ribs 92b, a diaphragm 92c, and a spine 92d. In the exemplary configuration shown in FIG. 8, dots indicate that the frame image 10 includes noises.

In this embodiment, the component image acquirer 2a is configured to acquire the first component image 11 that includes a first component whose noises are reduced from each of two frame images 10 that correspond to different acquisition times in the set of frame images 10. In other words, the image processing program 20 (see FIG. 1) is configured to cause the component image acquirer 2a to generate, based on first and second frame images 10 acquired at different time points in the set of frame images, first and second primary component images 11 such that the primary component images each include first component having a reduced noise component, respectively.

In this embodiment, the component image acquirer 2a is configured to reduce noises included in each of the two frame images 10 by at least one of frequency component processing, filtering and processing using a learned model, and to generate the two first component images 11.

In a case in which the noises are reduces by frequency component processing, the image acquirer 2a is configured to separate at least a high frequency component and a low frequency component by applying the frequency component processing to the two frame images 10, and to generate an image that includes the low frequency component of the high frequency component and the low frequency component as the first component image 11.

In a case in which the noises are reduces by filtering, the component image acquirer 2a is configured to apply filtering to the frame images by using the filter 23 (see FIG. 1). For example, the filter 23 includes a smoothing filter. In this embodiment, the component image acquirer 2a is configured to generate the first component images 11 by applying filtering using the smoothing filter to the two frame images 10. For example, a Gaussian filter, a bilateral filter, etc, are included in such smoothing filters.

If a contrast of the catheter 91 included in the frame image 10 is reduced by filtering by using the smoothing filter, a contrast of the first component in the first component image 11 is also reduced. For this reason, the component image acquirer 2a can generate the first component images 11 by applying filtering using the smoothing filter to the two frame images 10 and then applying filtering using an enhancement filter such as an unsharp mask or an edge enhancement filter. That is, the filter 23 can includes such an enhancement filter.

In a case in which noises are reduced by using the learned model, the component image acquirer 2a is configured to input frame images 10 to the learned model, which has learned to reduce noises from images, and to acquire the first component image 11 whose noises are reduced.

As shown in FIG. 8, the first component image 11 includes linear image components such as the catheter 91 and the vessel 92a, and linear image components such as ribs 92b outlines, a diaphragm 92c outline, and a spine 92d outline as the first component As shown in FIG. 8, the component image acquirer 2a is configured to acquire the second component image 12 including the second component, which is different from the first component, based on one of the two frame images 10. In other words, the image processing program 20 is configured to cause the component image acquirer 2a to acquire the second component image 12 including the second component, which is different from the first component, based on one of the two frame images 10.

In this embodiment, the component image acquirer 2a is configured to generate the second component image 12 by subtracting, from each of the two frame images 10, a corresponding image in the two first component images 11. The second component image 12 includes other parts than the ribs 92b outlines, the diaphragm 92c outline, and the spine 92d outline as the second component, and noises. Because the second component image 12 does not includes the first component, the second component image does not include the linear image components such as the catheter 91 and the vessel 92a, and the linear image components such as the ribs 92b outlines, the diaphragm 92c outline, and spine 92d outline.

With reference to FIG. 7 again, the configuration is described. The component image acquirer 2a is configured to output the acquired first component image 11 to the first component intermediate image generator 2b and the displacement estimator 2c. In addition, the component image acquirer 2a is configured to output the acquired second component image 12 to the conversion image generator 2d.

The first component intermediate image generator 2b is configured to generate, based on the two first component images 11, a first-component intermediate image 14 that includes the first component whose noises are reduced and corresponds to an acquisition time different from the acquisition times of the two frame images 10. Specifically, the first component intermediate image generator 2b is configured to generate the first-component intermediate image 14 by inputting the two first component images 11 to a first learned model 21 (see FIG. 6), which has learned to generate, based on a plurality of images, images that include an image component displaced. Alternatively, the first component intermediate image generator 2b can acquire the motion vectors 30a (see FIG. 5) of the first component from the two first component images 11, and generate the first component intermediate image 14 based on the motion vectors 30a acquired and the first component image 11.

The first component intermediate image generator 2b outputs the first component intermediate image 14 to the displacement estimator 2c. The first component intermediate image generator 2b outputs the first component intermediate image 14 to the interpolation image generator 2e.

The displacement estimator 2c estimates the displacement 30 of the first component based on the two first component images 11. Specifically, the displacement estimator 2c is configured to estimate the displacement 30 of the first component based on one of the two first component images 11, and the first component intermediate image 14. That is, the image processing program 20 is configured to cause the displacement estimator 2c to estimate the displacement 30 of the first component based on the two first component images 11.

In this embodiment, the displacement estimator 2c is configured to acquire the motion vectors 30a of the first component between frames of the two first component images 11 based on the two first component images 11, and to estimate the displacement 30 of the first component based on the motion vectors 30a acquired. In other words, the displacement estimator 2c estimates the displacement 30 of the first component by acquiring the motion vectors 30a of the first component based on the first component images 11 and the first component intermediate image 14. Alternatively, the displacement estimator 2c can be configured to estimate the displacement 30 of the first component by inputting two first component images 11 to the second learned model 22 (see FIG. 1), which has learned to estimate the displacement 30 of the image component from a plurality of images.

The second learned model 22 is produced, for example, by training a convolutional neural network or a learned model including a convolutional neural network. Also, in the production of the second learned model 22, in order to accurately estimate a displacement of the image component displaced by respirations and/or heartbeats of the subject 90, images a frame rate of which is sufficiently small as compared with the respirations and/or the heartbeats of the subject 90 are used as moving images for training the first learned model 21. The displacement estimator 2c outputs the estimated displacement 30 of the first component to the conversion image generator 2d.

The conversion image generator 2d is configured to acquire the conversion image 15 by converting the second component in the second component image 12 based on the displacement 30 of the first component estimated by the displacement estimator 2c. In other words, the image processing program 20 is configured cause the conversion image generator 2d to acquire the conversion image 15 by converting the second component in the second component image 12 based on the displacement 30 of the first component estimated.

In this embodiment, the conversion image generator 2d is configured to acquire the conversion image 15 by converting the second component by applying geometric transformation to the second component image 12 based on the estimated displacement 30 of the first component. Alternatively, the conversion image generator 2d can be configured to create a coordinate transformation map based on the displacement 30 of the first component estimated by the displacement estimator 2c, and to perform an affine transformation to the second component image 12 so as to generate the conversion image 15. The conversion image generator 2d then outputs the acquired conversion image 15 to the interpolation image generator 2e.

The interpolation image generator 2e is configured to generate the interpolation image 13 that corresponds to an acquisition time different from the acquisition times of the two frame images 10 based on the displacement 30 of the first component of the two first component images 11 and the second component image 12. That is, the image processing program 20 is configured cause the interpolation image generator 2e to generate the interpolation image 13 that corresponds to an acquisition time different from the acquisition times of the two frame images 10 based on the displacement 30 of the first component of the two first component images 11 and the second component image 12. In this embodiment, the interpolation image generator 2e is configured to generate the interpolation image 13 based on the first-component intermediate image 14 and the conversion image 15.

Here, a contrast of the first-component intermediate image 14 generated by using the first learned model 21 becomes different from contrasts of the frame images 10 in some cases. In such a case, a contrast of the interpolation image 13 generated based on the first component intermediate image 14 and the conversion image 15 becomes different from the contrasts of the frame images 10. If the contrasts between interpolation images 13 and frame images 10 are different, flicker will occur in the video due to the contrast difference when the interpolation images 13 and the frame images 10 are displayed as a video.

To address this, in this embodiment, the interpolation image generator 2e is configured to give weights to the first component intermediate image 14 and the conversion image 15 based on a contrast of the first-component intermediate image 14 and a contrast of the second component image 12, and then to combine the first component intermediate image 14 and the conversion image 15 with each other in generation of the interpolation image 13. For example, if the difference between the contrast of the first component intermediate image 14 and the contrast of the second component image 12 is large, the interpolation image generator 2e increases the weight to be given to the conversion image 15, and then combines the first component intermediate image 14 with the conversion image 15 whereby generating the interpolation image 13. Also, if the difference between the contrast of the first component intermediate image 14 and the contrast of the second component image 12 is small, the interpolation image generator 2e increases the weight to be given to the first component intermediate image 14, and then combines the first component intermediate image 14 with the conversion image 15 whereby generating the interpolation image 13. The interpolation image generator 2e outputs the generated interpolation image 13 to the moving-image generator 2f.

The moving-image generator 2f generates an interpolated moving image 16 based on the interpolation image 13 input from the interpolation image generator 2e and the frame image 10 acquired from the image acquirer 1. The interpolated moving image 16 has a higher frame rate than the video constituted of the frame images 10. In this embodiment, for example, in a case in which the frame rate of the video constituted of frame images 10 is 7.5 fps, the frame rate of the interpolated moving image 16 is 15 fps. The moving-image generator 2f is configured to generate the interpolated moving image 16 by using interpolation. The moving-image generator 2f outputs the interpolated moving image 16 to the storage 4.

(Generation of Interpolation Image Using Interpolation)

Figure 9:
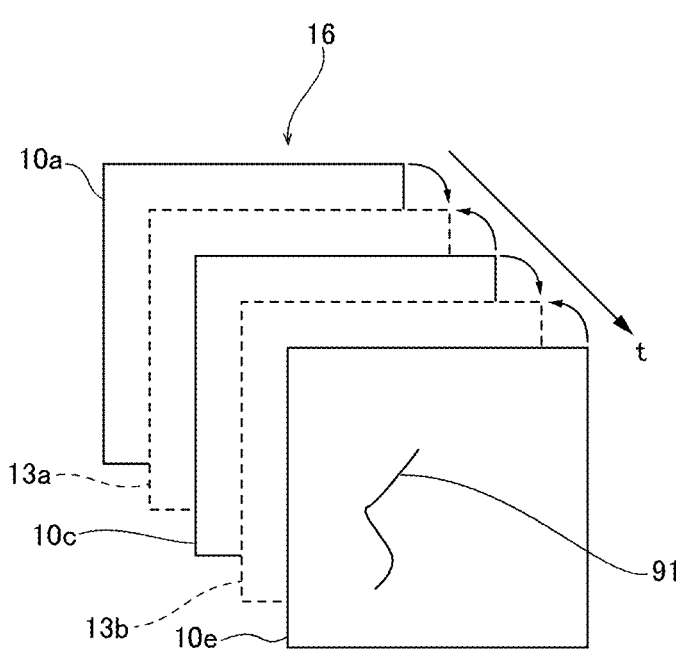
FIG. 9 is a schematic diagram illustrating a configuration in which interpolation images are generated by using interpolation by the image processor according to the one embodiment.

In a case in which the moving-image generator 2f (see FIG. 7) generates the interpolated moving image 16 by using interpolation, the moving-image generator 2f inserts interpolation images 13 between frames of frame images 10 (see FIG. 7) as shown in FIG. 9. In an exemplary configuration shown in FIG. 9, the moving-image generator 2f inserts a first interpolation images 13a between a first frame image 10a and a third frame image 10c. The first interpolation image 13a is an interpolation image 13 that is generated based on the first frame image 10a and the third frame image 10c.

Also, the moving-image generator 2f inserts a second interpolation image 13b between the third frame image 10c and a fifth frame image 10e. The second interpolation image 13b is an interpolation image 13 that is generated based on the third frame image 10c and the fifth frame image 10e. The moving-image generator 2f generates an interpolated moving image 16 by repeating the process. In a case in which the interpolated moving images 16 are generated by using interpolation, the image processor 2 generates a plurality of interpolation images 13 based on a set of frame images 10 after the frame images 10 are captured at a predetermined frame rate, and generates the interpolated moving image 16 by using interpolation. In other words, the interpolated moving image 16 is generated by using interpolation to improve the frame rate of the video constituted of the frame images 10 after capture of a video constituted of the frame image 10 is completed.

(Generation of Interpolation Image Using Extrapolation)

Figure 10:
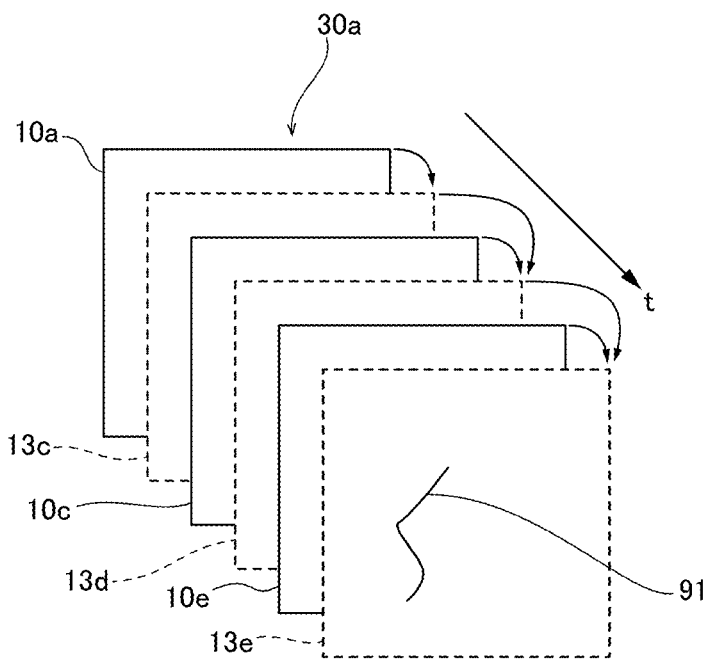
FIG. 10 is a schematic diagram illustrating a configuration in which interpolation images are generated by using extrapolation by the image processing apparatus according to the one embodiment.

In a case in which a first component image 11 is generated based on an interpolation image 13, the image processor 2 (see FIG. 7) generates a second component image 12 and a first component intermediate image 14 based on the first component image 11 generated based on the interpolation image 13, and generates the interpolation image 13. In this case, the image processor 2 can be configured to generate an interpolated moving image 16 by using extrapolation. In a case in which the image processor 2 generates an interpolated moving image 16 by using extrapolating, the image processor 2 (see FIG. 1) generates a third interpolation image 13c generated from a first frame image 10a and a frame image 10 (not shown) that is previous to the first frame image 10a, and inserts the third interpolation image 13c as a frame image 10 that follows the first frame image 10a as shown in FIG. 10. Subsequently, the image processor 2 generates a fourth interpolation image 13d based on the third interpolation image 13c and a third frame image 10c, and inserts the fourth interpolation image 13d as a frame image 10 that follows the third frame image 10c. Also, the image processor 2 generates a fifth interpolation image 13e based on the fourth interpolation image 13d and a fifth frame image 10e, and inserts the fifth interpolation image 13e as a frame image 10 that follows the fifth frame image 10e. As a result, the image processor 2 can generate an interpolated moving image 16 by using extrapolation. In other words, in the generation of the interpolated moving image 16 using extrapolation, every when a frame image 10 is captured, an interpolation image 13 is generated and inserted as a new frame image 10. In other words, the interpolated moving image 16 is generated by using extrapolation to improve the frame rate of the video constituted of the frame images 10 in real time during capture of a video constituted of the frame image 10.

In this embodiment, the image processor 2 (see FIG. 1) is configured to generate the first component image 11 based on a set of frame images 10 or an interpolation images 13. That is, the image processor 2 (component image acquirer 2*a*) can be configured to generate an interpolation image 13 based only on a frame image 10. Alternatively, the component image acquirer 2*a* can be configured to generate, based on a first component image 11 generated based on an interpolation image 13 that has been already generated, an interpolation image 13 as an interpolation image 13 that is different from the interpolation image 13 that has been already generated. Both in a case in which the first component image 11 is generated based only on a frame image 10, and in a case in which the first component image 11 is generated by using a frame image 10 and an interpolation image 13, the image processor 2 can be configured to generate an interpolated moving image 16 (see FIG. 7) by using interpolation or extrapolation.

(Interpolation Image Generation Processing)

Processes executed by the image processor 2 (see FIG. 7) to generate interpolation images 13 (see FIG. 7) is now described with reference to FIG. 11. The processes illustrated in FIG. 11 are executed to generate interpolation images 13 and to generate an interpolated moving image 16 by interpolation by using the image processor 2.

In step 101, the image acquirer 1 (see FIG. 7) acquires a set of frame images 10 (see FIG. 7) from the X-ray imaging apparatus 200 (see FIG. 1).

In step 102, the component image acquirer 2*a* (see FIG. 7) acquires two first component images 11 (see FIG. 7) each of which is acquired from corresponding one of two frame images 10 that correspond to different acquisition times in the set of frame images 10 and each of which includes a first component whose noises are reduced.

In step 103, the component image acquirer 2*a* acquires, based on one of the two frame images 10, a second component image 12 (see FIG. 7) including a second component that is different from the first component.

In step 104, the displacement estimator 2*c* (see FIG. 7) estimates a displacement 30 of the first component (see FIG. 7) based on the two first component images 11.

In step 105, the first component intermediate image generator 2*b* (see FIG. 7) generates a first-component intermediate image 14 (see FIG. 7) based on the two first component images 11.

In step 106, the conversion image generator 2*d* (see FIG. 7) generates a conversion image 15 (see FIG. 7) based on the displacement 30 of the first component, and the second component image 12.

In step 107, the interpolation image generator 2*e* (see FIG. 7) generates the interpolation image 13 that corresponds to an acquisition time different from the acquisition times of the two frame images 10 based on the displacement 30 of the first component of the two first component images 11 and the second component image 12.

In step 108, the image processor 2 determines whether to complete generation of the interpolation image 13. For example, the image processor 2 determines whether to complete the generation of the interpolation image 13 based on whether interpolation images 13 corresponding to the plurality of input frame images 10 have been generated. If the generation of the interpolation image 13 is completed, the procedure goes to step 109. If the generation of the interpolation image 13 is not completed, the procedure goes to step 111.

In step 109, the moving-image generator 2*f* (see FIG. 7) generates an interpolated moving image 16 (see FIG. 7).

In step 110, the storage 4 (see FIG. 7) stores the interpolated moving image 16. After that, the procedure ends.

If the procedure goes from step 108 to step 111, the component image acquirer 2*a* acquires a next frame image 10 in step 111. Subsequently, the procedure goes to step 102.

Any one of the process in step 102 and the process in step 103 can be executed before another process. Also, any one of the process in step 104 and the process in step 105 can be executed before another process.

In a case in which the image processor 2 generates the interpolated moving image 16 by using extrapolation, the process of step 109 is executed after step 107. The controller 3 is configured to display the interpolated moving image 16 stored in the storage 4 on the display 5.

Advantages of the Embodiment

In this embodiment, the following advantages are obtained.

In this embodiment, as described above, the image processing apparatus 100 is an image processing apparatus for applying image processing to a set of frame images 10, the frame images constituting a video, the image processing apparatus including an image acquirer 1 configured to acquire the set of frame images 10; and an image processor 2 configured to apply image processing to the set of frame images 10 acquired by the image acquirer 1, wherein the image processor 2 is configured to generate, based on first and second frame images 10 acquired at different time points in the set of frame images, first and second primary component images 11 such that the primary component images each include first component having a reduced noise component, respectively, to generate a second component image 12 including a second component that is different from the first component based on one of the two frame images 10, to estimate a displacement 30 of the first component based on the two first component images 11, and to generate an interpolation image 13 that corresponds to an acquisition time different from the acquisition times of the two frame images 10 based on the displacement 30 of the first component of the two first component images 11 and the second component image 12.

Because the displacement 30 of the first component is estimated based on the first component images 11 whose noises are reduced, it is possible to accurately estimate the displacement 30 of the first component as compared with a configuration in which a displacement 30 of the first component is estimated based on images whose noises are not reduced. Accordingly, because the displacement 30 of the first component can be accurately estimated, it is possible to improve accuracy of the interpolation image 13 generated based on the displacement 30 of the first component of the two first component images 11 and the second component image 12. Consequently, it is possible to accurately generate an interpolation image 13 even in a case in which the interpolation image 13 is generated based on a set of frame images 10 including noises.

In this embodiment, the image processing apparatus 100 is an image processing apparatus for applying image processing to a set of frame images 10, the frame images constituting a video of radiographic images, the image processing apparatus including an image acquirer 1 configured to acquire the radiographic images as the video; and an image processor 2 configured to apply image processing to the radiographic images acquired by the image acquirer 1, wherein the image processor 2 is configured to generate, based on first and second frame images 10 acquired at different time points in the set of frame images included in the radiographic images, first and second primary component images 11 such that the primary component images each include first component having a reduced noise component, respectively, to generate a second component image 12 including a second component that is different from the first component based on one of the two frame images 10, to estimate a displacement 30 of the first component based on the two first component images 11, and to generate a radiographic interpolation image (interpolation image 13) that is a radiographic image corresponding to an acquisition time different from the acquisition times of the two frame images 10 based on the displacement 30 of the first component of the two first component images 11 and the second component image 12.

Here, in a case in which a video of radiographic images is captured, in order to reduce a radiation dosage, radiation intensity is reduced. In this case, an SN ratio of a radiographic image is reduced, and as a result the image includes a larger amount of noise. To address this, according to the aforementioned configuration, the displacement 30 of the first component is estimated based on the first component images 11, which are acquired from radiographic images and whose noises are reduced, and as a result it is possible to accurately estimate the displacement 30 of the first component as compared with a configuration in which a displacement 30 of the first component is estimated based on radiographic images whose noises are not reduced. Accordingly, because the displacement 30 of the first component can be accurately estimated, it is possible to improve accuracy of the interpolation image 13 generated based on the displacement 30 of the first component of the two first component images 11 and the second component image 12. For this reason, because the total number of imaging shots using radiofrequency irradiation can be reduced by partial-shot-omission imaging while reducing radiation intensity in order to reduce a radiation dosage, it is possible to provide an image processing apparatus 100 capable of improving accuracy of the interpolation image 13 while reducing the radiation dosage.

In this embodiment, the image processing method is an image processing method for applying image processing to a set of frame images 10, the frame images constituting a video, the image processing method including a step of generating, based on first and second frame images 10 acquired at different time points in the set of frame images included in the radiographic images, first and second primary component images 11 such that the primary component images each include first component having a reduced noise component, respectively; a step of generating a second component image 12 including a second component that is different from the first component based on one of the two frame images 10; a step of estimating a displacement 30 of the first component based on the two first component images 11; and a step of generating an interpolation image 13 that corresponds to an acquisition time different from the acquisition times of the two frame images 10 based on the displacement 30 of the first component of the two first component images 11 and the second component image 12.

Consequently, similar to the aforementioned image processing apparatus 100, it is possible to provide an image processing method capable of accurately generating an interpolation image 13 even in a case in which the interpolation image 13 is generated based on a set of frame images 10 including noises.

In this embodiment, the storage 4 is a storage medium storing an image processing program 20 to be executed in an image processing apparatus 100 for applying image processing to a set of frame images 10, the frame images constituting a video, the image processing program causing the image processing apparatus 100 to perform a process of generating, based on first and second frame images 10 acquired at different time points in the set of frame images included in the radiographic images, first and second primary component images 11 such that the primary component images each include first component having a reduced noise component, respectively; a process of generating a second component image 12 including a second component that is different from the first component based on one of the two frame images 10; a process of estimating a displacement 30 of the first component based on the two first component images 11; and a process of generating an interpolation image 13 that corresponds to an acquisition time different from the acquisition times of the two frame images 10 based on the displacement 30 of the first component of the two first component images 11 and the second component image 12.

Consequently, similar to the aforementioned image processing apparatus 100, it is possible to provide a storage 4 capable of accurately generating an interpolation image 13 even in a case in which the interpolation image 13 is generated based on a set of frame images 10 including noises.

In addition, following additional advantages can be obtained by the aforementioned embodiment added with configurations discussed below.

That is, in this embodiment, as discussed above, the component image acquirer 2a (image processor 2) is configured to to generate, based on the two first component images 11, a first-component intermediate image 14 that includes the first component whose noises are reduced and corresponds to an acquisition time different from the acquisition times of the two frame images 10, to estimate a displacement 30 of the first component based on one of the two first component images 11 and the first-component intermediate image 14, to acquire a conversion image 15 by converting the second component in the second component image 12 based on the estimated displacement 30 of the first component, and to generate the interpolation image 13 based on the first-component intermediate image 14 and the conversion image 15. Because the first component intermediate image 14 is generated based on the first component whose noises are reduced, it is possible to improve accuracy of the first component intermediate image 14 as compared with a configuration in which the first component intermediate image 14 is generated based on the first component whose noises are not reduced. Also, because the displacement 30 of the first component is estimated based on the first component intermediate image 14 and the first component image 11 that are generated based on the first component whose noises are reduced, it is possible to accurately estimate the displacement 30 of the first component as compared with a configuration in which a displacement 30 of the first component is estimated based on the first component intermediate image 14 and the first component image 11 that are generated based on the first component whose noises not are reduced. Accordingly, it is possible to improve accuracy of the conversion image 15 generated based on the displacement 30 of the first component. Consequently, because the interpolation image 13 is generated based on the first component intermediate image 14 and the conversion image 15 whose accuracies are improved, it is possible to further improve accuracy of the interpolation image 13.

In this embodiment, as discussed above, the frame images 10 include radiographic images; and the component image acquirer 2a (image processor 2) is configured to acquire the first component image 11 and the second component image 12 based on the radiographic images, which constitute a video. Because the first component image 11 and the second component image 12 are acquired from the radiographic images, which constitute a video, it is possible to improve accuracy of the interpolation images 13, which form a radiographic image. For example, even in a case in which the number of radiofrequency (X-ray) irradiations is reduced in order to reduce a radiation dosage so that the number of frames of radiographic images, which constitute a video, is reduced, it is possible to generate an interpolation image 13 with improved accuracy. As a result, because the number of frames of the radiographic image, which is a video, can be increased by the interpolation images 13 with improved accuracy, it is possible to prevent reduction of accuracy of the radiographic images, which constitute a video. Consequently, it is possible to reduce the radiation dose while preventing reduction of accuracy of the radiographic images, which constitute a video.

In this embodiment, as described above, the first component intermediate image generator 2b (image processor 2) is configured to generate the first-component intermediate image 14 by inputting the two first component images 11 to a first learned model 21 that has learned to generate, based on a plurality of images, images that include an image component displaced. Here, for example, in a case in which a displacement of an image component in the plurality of images is estimated by acquiring motion vectors, it is difficult to accurately estimate the displacement of the image component if the image component is deformed in the plurality of images. When the first learned model 21 is produced by training the first learned model to generate images that include displacements of image components based on a plurality of images, the first learned model 21 that can acquire a displacement of an image component even if the image component is deformed in a plurality of images can be produced by training the first learned model by using teacher data including images that include an image component deformed in a plurality of images. For this reason, as described above, because the first-component intermediate image 14 is generated by inputting the two first component images 11 to the first learned model 21, even if a image component is deformed in a plurality of images, the first component intermediate image 14 that accurately reflects a displacement of the first component can be generated based on the first learned model 21. Consequently, it is possible to prevent reduction of accuracy of the first component intermediate image 14 even if the first component is deformed in a plurality of first component images 11.

In this embodiment, as described above, the component image acquirer 2a (image processor 2) is configured to generate the first component image 11 based on a set of frame images 10 or an interpolation images 13. Because the interpolation image 13 can be used as a frame image 10 to generate the first component image 11, as compared with a configuration in which the first component image 11 is generated based on only a set of frame images 10, the number of frame images 10 to be used to generate the first component image 11 can be increased without increasing a frame rate when capturing a set of frame images 10. Because the number of interpolation images 13 generate can be increased as compared with a configuration in which interpolation images 13 are generated based on only frame images 10, it is possible to output a video capable of showing a displacement of an image component in more detail.

In this embodiment, as described above, the interpolation image generator 2e (image processor 2) is configured to give weights to the first component intermediate image 14 and the conversion image 15 based on a contrast of the first-component intermediate image 14 and a contrast of the second component image 12, and then to combine the first component intermediate image 14 and the conversion image 15 with each other in generation of the interpolation image 13. For example, in a case in which a difference between contrasts of the first component intermediate image 14 and a set of frame images 10 is large, a difference between contrasts of the interpolation image 13, which is produced based on the first component intermediate image 14 and the conversion image 15, and the frame images 10 becomes correspondingly large. In this case, flicker will occur in the video due to the contrast difference between frames in which the interpolation images 13 are displayed and frames in which the set of frame images 10 are displayed. To address this, in this embodiment, because the interpolation image generator 2e is configured to give weights to the first component intermediate image 14 and the conversion image 15 based on a contrast of the first-component intermediate image 14 and a contrast of the second component image 12, and then to combine the first component intermediate image 14 and the conversion image 15 with each other as discussed above, if a difference between contrasts of the set of frame images 10 and the interpolation image 13 is large, increase of the difference between contrasts of the interpolation image 13 and the frame images 10 can be suppressed by increasing a weight given to the conversion image 15. Accordingly, it is possible to reduce the flicker, which occurs in the video (interpolated moving image 16) formed of the interpolation images 13 and the frame images 10 due to the contrast difference between frame images 10. If the difference between the contrasts of frame images 10 and the interpolation image 13 is small, the interpolation image 13 whose visibility of the first component is improved can be generated while suppressing noises by increasing the weight given to the first component intermediate image 14. Consequently, it is possible to improve the visibility of the first component in the video (interpolated moving image 16) generated based on the frame images 10 and the interpolation images 13.

In this embodiment, as discussed above, the displacement estimator 2c (image processor 2) is configured to acquire motion vectors 30a of the first component between frames of the two first component images 11 based on the two first component images 11, and to estimate a displacement 30 of the first component by inputting the two first component images 11 to a second learned model 22 that has learned to estimate a displacement 30 of the first component based on the motion vector 30a acquired or to estimate a displacement 30 of an image component from the plurality of images. Here, the motion vectors 30a between the plurality of images are acquired based on motions of the feature points included in each image. Accordingly, in a case in which the displacement 30 of the first component is estimated based on the motion vectors 30a of the first component, because the motion vectors 30a can be acquired by comparing the feature points in the image between two frames of the first component images 11, it is possible to prevent increase of a processing load on the image processor 2. In a case in which the displacement 30 of the first component is estimated by inputting two first component images 11 to the second learned model 22, which has learned to estimate the displacement 30 of the image component from a plurality of images, the displacement 30 of the first component can be estimated even if the first component is deformed in the two first component images 11.

In this embodiment, as described above, the component image acquirer 2a (image processor 2) is configured to reduce noises included in each of the two frame images 10 by at least one of frequency component processing, filtering and processing using a learned model, and to generate the two first component images 11. The noises included in the two frame images 10 are high-frequency components such as white noises, etc., for example. For this reason, the noises can be easily reduced from the two frame images 10 by removing high-frequency components by using at least one of frequency component processing, filtering, and processing using a learned model. Consequently, the first component image 11 can be easily generated by reducing the noises from the two frame images 10 by removing high-frequency components by using at least one of frequency component processing, filtering, and processing using a learned model.

In this embodiment, as described above, the component image acquirer 2a (image processor 2) is configured to separate at least a high frequency component and a low frequency component by applying the frequency component processing to the two frame images 10, and to generate an image that includes the low frequency component of the high frequency component and the low frequency component as the first component image 11. According to this configuration in which each of the two frame images 10 is separated into the high frequency component and the low frequency component so that an image that includes the low frequency component is generated as the first component image 11, it is possible to easily prevent the first component image 11 from including the noises. Consequently, the first component image 11 whose noises are reduced can be easily generated by using the frequency component processing.

In this embodiment, as described above, the component image acquirer 2a (image processor 2) is configured to generate the first component images 11 by applying filtering using the smoothing filter to the two frame images 10. Accordingly, noises can be easily reduced in the two frame images 10 by applying filtering using the smoothing filter to the two frame images. Consequently, it is possible to easily generate the first component image 11 whose noises are reduced by reducing the noises in the two frame images 10 by applying filtering using the smoothing filter.

In this embodiment, as described above, the component image acquirer 2a (image processor 2) is configured to generate the second component image 12 by subtracting, from each of the two frame images 10, a corresponding image in the two first component images 11. Accordingly, it is possible to acquire, by subtracting, from each of the two frame images 10, the first component, the second component image 12 including some image components other than the first component in all the image components included in the frame images 10. For this reason, dissimilar to a configuration in which the second component image 12 is acquired by extracting one or some of all the image components from each of the two frame images 10 as the second component, it is possible to generate the second component image 12 including image components other than the first component in image components included in the frame images 10, which are original images. Consequently, it is possible to prevent the interpolation image 13 from becoming unnatural due to large differences between image components that are included in the interpolation image 13, which is generated based on the first component image 11 and the second component image 12, and image components that are included in the frame images 10.

In this embodiment, as described above, the conversion image generator 2d (image processor 2) is configured to acquire the conversion image 15 by converting the second component by applying geometric transformation to the second component image 12 based on the estimated displacement 30 of the first component. Accordingly, because the displacement 30 of the first component is obtained based on the first component images 11 whose noises are reduced, accuracy of estimation of the displacement is higher than a displacement of an image component that is estimated based on images whose noises are not reduced. According to the aforementioned configuration, because the geometric transformation processing is applied to the second component image 12 based on the displacement 30 of the first component whose estimation accuracy is high, it is possible to accurately convert the second component of the second component image 12. Consequently, because the accuracy of the conversion image 15 can be improved, it is possible to further reliably prevent the interpolation image 13 from becoming unnatural.

Modified Embodiments

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

Figure 12:
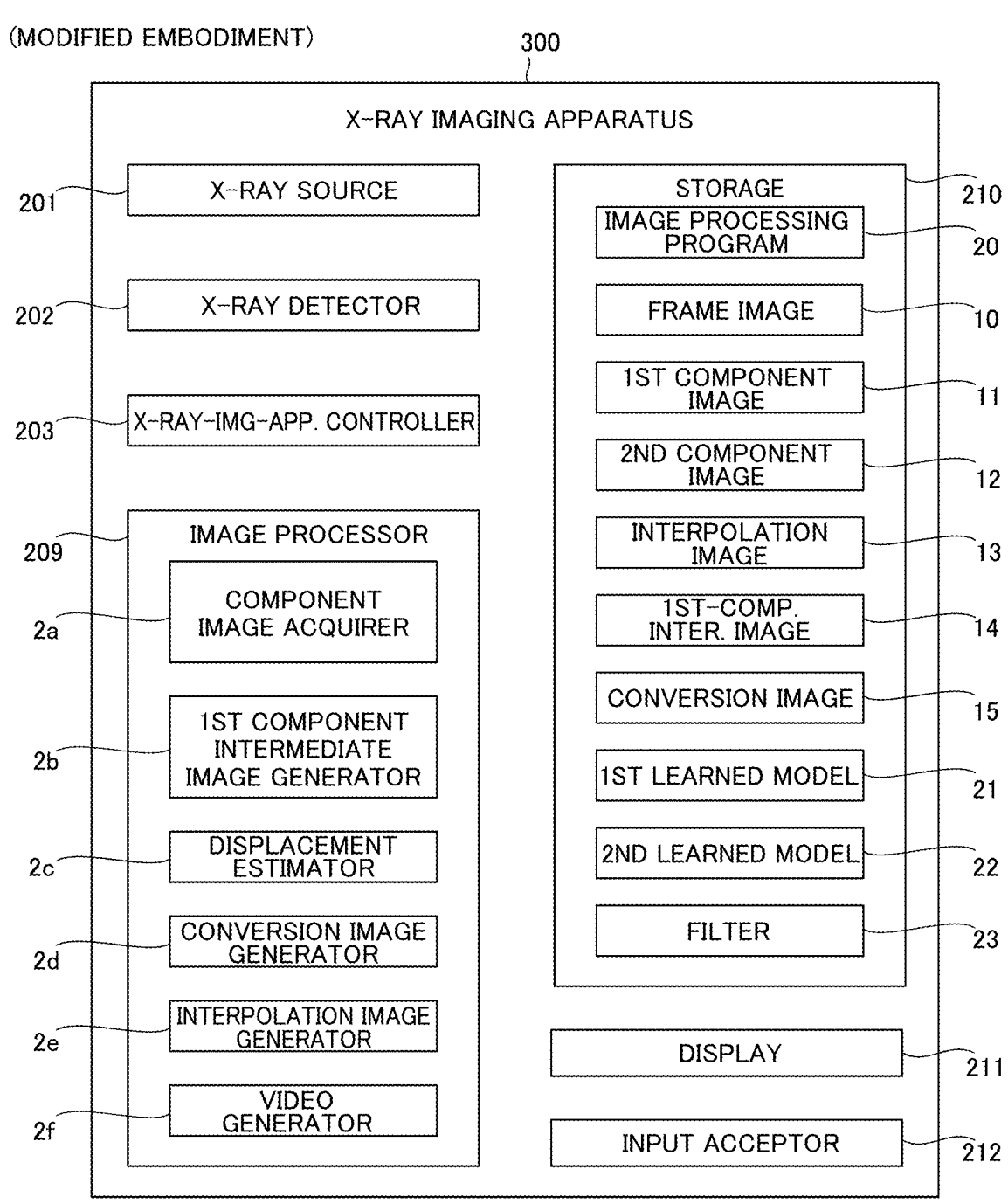
FIG. 12 is a block diagram showing an X-ray imaging apparatus including an image processor according to a modified embodiment.

While the example in which the image processing apparatus 100 and X-ray imaging apparatus 200 are provided as separated apparatuses has been shown in the aforementioned embodiment, the present invention is not limited to this. Alternatively, as shown in an X-ray imaging apparatus 300 according to a modified embodiment of FIG. 12, the image processor 2 configured to execute the image processing program 20 can be included in the X-ray imaging apparatus 300, for example. The X-ray imaging apparatus 300 according to the modified embodiment includes an image processor 209, a storage 210, a display 211 and an input acceptor 212, and can be said to be different from the X-ray imaging apparatus 200 in the aforementioned embodiment.

The image processor 209 has a similar configuration to the image processor 2 in the aforementioned embodiment. Also, the storage 210, the display 211, and the input acceptor 212 have similar configurations to the storage 4, the display 5, and the input acceptor 6 according to the aforementioned embodiment, respectively.

That is, in the X-ray imaging apparatus 300, the image processor 209 provided in the X-ray imaging apparatus 300 acquires the first component image 11 and the second component image 12 based on the frame images 10. The image processor 209 then generates the interpolation image 13 based on the first component image 11 and the second component image 12. A configuration of the image processor 209 that generates the interpolation image 13 is similar to the image processor 2 in the aforementioned embodiment, and its description is omitted.

According to this configuration, it is possible to provide the X-ray imaging apparatus 300 capable of accurately generating the interpolation image 13 even in a case in which the interpolation image 13 is generated based on a set of frame images 10 including noises.

While the example in which the image processor 2 generates the first component intermediate image 14 and the conversion image 15, and generates the interpolation image 13 based on the first component intermediate image 14 and the conversion image 15 has been shown in the aforementioned embodiment, the present invention is not limited to this. Alternatively, the image processor 2 cannot generate the first component intermediate image 14 and the conversion image 15, for example. In this case, the image processor can be configured to generate the interpolation image 13 directly from the first component image 11 and the second component image 12 without generating the first component intermediate image 14 and the conversion image 15 by using a learned model that has learned to generate the interpolation image 13 based on the first component image 11 and the second component image 12.

While the example in which the frame images 10 include radiographic images has been shown in the aforementioned embodiment, the present invention is not limited to this. For example, the frame images can include optical images, which is captured by an optical camera, of a subject that is degraded by the light (illumination light) with which the subject is irradiated in the image capturing.

While the example in which the radiographic images are X-ray images has been shown in the aforementioned embodiment, the present invention is not limited to this. For example, the radiographic images can be gamma-ray images captured by using gamma rays for radiofrequency irradiations.

While the example in which the image processor 2 (interpolation image generator 2e) is configured to give weights to the first component intermediate image 14 and the conversion image 15 based on a contrast of the first-component intermediate image 14 and a contrast of the second component image 12, and then to combine the first component intermediate image 14 and the conversion image 15 with each other has been shown in the aforementioned embodiment, the present invention is not limited to this. Alternatively, the image processor can be configured to generate the interpolation image 13 by combining the first component intermediate image 14 and the conversion image 15 with each other without weighting, for example. However, in such a configuration in which the first component intermediate image 14 and the conversion image 15 are combined with each other without weighting, a contrast difference between the interpolation image 13 and each frame image 10 occurs in some cases. In such a case, flicker will occur in the output moving image (interpolated post moving image 16). For this reason, the image processor is preferably configured to give weights to the first component intermediate image 14 and the conversion image 15 based on a contrast of the first-component intermediate image 14 and a contrast of the second component image 12, and then to combine the first component intermediate image 14 and the conversion image 15 with each other.

While the example in which the image processor 2 is configured to apply frequency component processing to the frame images 10 to separate at least a high frequency component and a low frequency component has been shown in the aforementioned embodiment, the present invention is not limited to this. For example, the image processor can be configured to apply frequency component processing to the frame images 10 to separate a high frequency component, an intermediate frequency component, and a low frequency component. In this case, the image processor can acquire an image that does not include the high-frequency component as the first component image 11. That is, the image processor can be configured to acquire an image that includes both the intermediate frequency component and the low frequency component as the first component image 11, or to acquire an image that includes only the intermediate frequency component as the first component image 11. The image processor is only required to acquire an image that includes at least a high frequency component as the second component image. That is, the image processor can be configured to acquire an image that includes both the high frequency component and the low frequency component as the second component image 12, or to acquire an image that includes only the high frequency component as the second component image 12. That is, the image processor can be configured to acquire the first component image 11 and the second component image 12 by using one or some of the image components that are included in the frame images 10.

While the example in which the image processor 2 is configured to generate the second component image 12 by subtracting, from each of the two frame images 10, a corresponding image in the two first component images 11 has been shown in the aforementioned embodiment, the present invention is not limited to this. Alternatively, the image processor 2 can be configured to acquire the second component image 12 by generating the second component from each of the two frame images 10, for example.

While the example in which the frame rate of the video is 7.5 fps has been shown in the aforementioned embodiment, the present invention is not limited to this. For example, the frame rate of the video can be 15 fps. The frame rate of the moving can be any frame rate as long as it is appropriate for a video to be displayed in treatment of the subject 90 by an operator such as a doctor by using the catheter 91.

Also, while the example in which the procedure of generating the interpolation image by using the image processing apparatus according to the present invention has been described by using a flow-driven type flowchart in which processes are sequentially performed along a processing flow for sake of illustration in the aforementioned embodiment, the present invention is not limited to this. In the present invention, the procedure of generating the interpolation image 13 by using the image processing apparatus 100 can be realized by an event-driven type processing that executes processes in response to occurrence of events. In this case, the procedure of generating the interpolation image 13 by using the image processing apparatus 100 can be realized entirely by such an event-driven type processing or by a combination of such a flow-driven type processing and such an event-driven type processing.

Modes

The aforementioned exemplary embodiment will be understood as concrete examples of the following modes by those skilled in the art.

(Mode Item 1)

An image processing apparatus for applying image processing to a set of frame images, the frame images constituting a video according to mode item 1 is an image processing apparatus including an image acquirer configured to acquire the set of frame images; and an image processor configured to apply image processing to the set of frame images acquired by the image acquirer, wherein the image processor is configured to generate, based on first and second frame images acquired at different time points in the plurality of frame images, first and second primary component images such that the primary component images each include first component having a reduced noise component, respectively, to generate a second component image including a second component that is different from the first component based on one of the two frame images, to estimate a displacement of the first component based on the two first component images, and to generate an interpolation image that corresponds to an acquisition time different from the acquisition times of the two frame images, based on the displacement of the first component between the two first component images, and the second component image.

(Mode Item 2)

The image processing apparatus according to mode item 1, wherein the image processor is configured to generate, based on the two first component images, a first-component intermediate image that includes the first component whose noises are reduced and corresponds to an acquisition time different from the acquisition times of the two frame images, to estimate a displacement of the first component based on one of the two first component images, and the first-component intermediate image, to acquire a conversion image by converting the second component in the second component image based on the estimated displacement of the first component, and to generate the interpolation image based on the first-component intermediate image and the conversion image.

(Mode Item 3)

The image processing apparatus according to mode item 2, wherein the frame images include radiographic images; and the image processor is configured to acquire the first component image and the second component image based on the radiographic images, which constitute a video.

(Mode Item 4)

The image processing apparatus according to mode item 3, wherein the image processor is configured to generate the first-component intermediate image by inputting the two first component images to a first learned model that has learned to generate, based on a plurality of images, images that include an image component displaced.

(Mode Item 5)

The image processing apparatus according to any of mode items 1 to 4, wherein the image processor is configured to generate the first component images based on the set of frame images or the interpolation image.

(Mode Item 6)

The image processing apparatus according to any of mode items 2 to 4, wherein the image processor is configured to give weights to the first component intermediate image and the conversion image based on a contrast of the first-component intermediate image and a contrast of the second component image, and then to combine the first component intermediate image and the conversion image with each other in generation of the interpolation image.

(Mode Item 7)

The image processing apparatus according to any of mode items 1 to 6, wherein the image processor is configured to acquire a motion vector of the first component between frames of the two first component images based on the two first component images, and to estimate a displacement of the first component based on the motion vector acquired or to estimate a displacement of an image component by inputting the two first component images to a second learned model that has learned to estimate a displacement of the first component from the plurality of images.

(Mode Item 8)

The image processing apparatus according to any of mode items 1 to 7, wherein the image processor is configured to reduce noises included in each of the two frame images by at least one of frequency component processing, filtering and processing using a learned model, and to generate the two first component images.

(Mode Item 9)

The image processing apparatus according to mode item 8, wherein, the image processor is configured to separate at least a high frequency component and a low frequency component by applying the frequency component processing to the two frame images, and to generate an image that includes the low frequency component of the high frequency component and the low frequency component as the first component image.

(Mode Item 10)

The image processing apparatus according to mode item 8, wherein the image processor is configured to generate the first component images by applying filtering using a smoothing filter to the two frame images.

(Mode Item 11)

The image processing apparatus according to any of mode items 1 to 10, wherein the image processor is configured to generate the second component image by subtracting, from each of the two frame images, a corresponding image in the two first component images.

(Mode Item 12)

The image processing apparatus according to any of mode items 2 to 4, wherein the image processor is configured to acquire the conversion image by converting the second component by applying geometric transformation to the second component image based on the estimated displacement of the first component.

(Mode Item 13)

An image processing apparatus for applying image processing to a set of frame images, the frame images constituting a video of radiographic images according to mode item 13 is an image processing apparatus including an image acquirer configured to acquire the radiographic images as the video; and an image processor configured to apply image processing to the radiographic images acquired by the image acquirer, wherein the image processor is configured to generate, based on first and second frame images acquired at different time points in the set of frame images included in the radiographic images, first and second primary component images such that the primary component images each include first component having a reduced noise component, respectively, to generate a second component image including a second component that is different from the first component based on one of the two frame images, to estimate a displacement of the first component based on the two first component images, and to generate a radiographic interpolation image that is a radiographic image corresponding to an acquisition time different from the acquisition times of the two frame images, based on the displacement of the first component between the two first component images, and the second component image.

(Mode Item 14)

An image processing method for applying image processing to a set of frame images, the frame images constituting a video according to mode item 14 is an image processing method including a step of generating, based on first and second frame images acquired at different time points in the set of frame images included in the radiographic images, first and second primary component images such that the primary component images each include first component having a reduced noise component, respectively; a step of generating a second component image including a second component that is different from the first component based on one of the two frame images; a step of estimating a displacement of the first component based on the two first component images; and a step of generating an interpolation image that corresponds to an acquisition time different from the acquisition times of the two frame images, based on the displacement of the first component between the two first component images, and the second component image.

(Mode Item 15)

A storage medium according to mode item 15 stores an image processing program to be executed in an image processing apparatus for applying image processing to a set of frame images, the frame images constituting a video, the image processing program causing the image processing apparatus to perform a process of generating, based on first and second frame images acquired at different time points in the set of frame images included in the radiographic images, first and second primary component images such that the primary component images each include first component having a reduced noise component, respectively; a process of generating a second component image including a second component that is different from the first component based on one of the two frame images; a process of estimating a displacement of the first component based on the two first component images; and a process of generating an interpolation image that corresponds to an acquisition time different from the acquisition times of the two frame images, based on the displacement of the first component between the two first component images, and the second component image.

What is claimed is:

1. An image processing apparatus for applying image processing to a set of frame images, the frame images constituting a video, the image processing apparatus comprising:

an image acquirer configured to acquire the set of frame images; and an image processor configured to apply image processing to the set of frame images acquired by the image acquirer, wherein the image processor is configured to generate, based on first and second frame images acquired at different time points in the plurality of frame images, first and second primary component images such that the primary component images each include first component having a reduced noise component, respectively, to generate a second component image including a second component that is different from the first component based on one of the two frame images, to estimate a displacement of the first component based on the two first component images, and to generate an interpolation image that corresponds to an acquisition time different from the acquisition times of the two frame images, based on the displacement of the first component between the two first component images, and the second component image.

2. The image processing apparatus according to claim 1, wherein the image processor is configured to generate, based on the two first component images, a first-component intermediate image that includes the first component whose noises are reduced and corresponds to an acquisition time different from the acquisition times of the two frame images, to estimate a displacement of the first component based on one of the two first component images, and the first-component intermediate image, to acquire a conversion image by converting the second component in the second component image based on the estimated displacement of the first component, and to generate the interpolation image based on the first-component intermediate image and the conversion image.

3. The image processing apparatus according to claim 2, wherein the frame images include radiographic images; and the image processor is configured to acquire the first component image and the second component image based on the radiographic images, which constitute a video.

4. The image processing apparatus according to claim 3, wherein the image processor is configured to generate the first-component intermediate image by inputting the two first component images to a first learned model that has learned to generate, based on a plurality of images, images that include an image component displaced.

5. The image processing apparatus according to claim 1, wherein the image processor is configured to generate the first component images based on the set of frame images or the interpolation image.

6. The image processing apparatus according to claim 2, wherein the image processor is configured to give weights to the first component intermediate image and the conversion image based on a contrast of the first-component intermediate image and a contrast of the second component image, and then to combine the first component intermediate image and the conversion image with each other in generation of the interpolation image.

7. The image processing apparatus according to claim 1, wherein the image processor is configured to acquire a motion vector of the first component between frames of the two first component images based on the two first component images, and to estimate a displacement of the first component based on the motion vector acquired or to estimate a displacement of an image component by inputting the two first component images to a second learned model that has learned to estimate a displacement of the first component from the plurality of images.

8. The image processing apparatus according to claim 1, wherein the image processor is configured to reduce noises included in each of the two frame images by at least one of frequency component processing, filtering and processing using a learned model, and to generate the two first component images.

9. The image processing apparatus according to claim 8, wherein the image processor is configured to separate at least a high frequency component and a low frequency component by applying the frequency component processing to the two frame images, and to generate an image that includes the low frequency component of the high frequency component and the low frequency component as the first component image.

10. The image processing apparatus according to claim 8, wherein the image processor is configured to generate the first component images by applying filtering using a smoothing filter to the two frame images.

11. The image processing apparatus according to claim 1, wherein the image processor is configured to generate the second component image by subtracting, from each of the two frame images, a corresponding image in the two first component images.

12. The image processing apparatus according to claim 2, wherein the image processor is configured to acquire the conversion image by converting the second component by applying geometric transformation to the second component image based on the estimated displacement of the first component.

13. An image processing apparatus for applying image processing to a set of frame images, the frame images constituting a video of radiographic images, the image processing apparatus comprising:

an image acquirer configured to acquire the radiographic images as the video; and an image processor configured to apply image processing to the radiographic images acquired by the image acquirer, wherein the image processor is configured to generate, based on first and second frame images acquired at different time points in the set of frame images included in the radiographic images, first and second primary component images such that the primary component images each include first component having a reduced noise component, respectively, to generate a second component image including a second component that is different from the first component based on one of the two frame images, to estimate a displacement of the first component based on the two first component images, and to generate a radiographic interpolation image that is a radiographic image corresponding to an acquisition time different from the acquisition times of the two frame images, based on the displacement of the first component of the two first component images and the second component image.

14. An image processing method for applying image processing to a set of frame images, the frame images constituting a video, the image processing method comprising:

a step of generating, based on first and second frame images acquired at different time points in the set of frame images included in the radiographic images, first and second primary component images such that the primary component images each include first component having a reduced noise component, respectively;

a step of generating a second component image including a second component that is different from the first component based on one of the two frame images;

a step of estimating a displacement of the first component based on the two first component images; and a step of generating an interpolation image that corresponds to an acquisition time different from the acquisition times of the two frame images, based on the displacement of the first component of the two first component images and the second component image.

15. A storage medium storing an image processing program to be executed in an image processing apparatus for applying image processing to a set of frame images, the frame images constituting a video, the image processing program causing the image processing apparatus to perform a process of generating, based on first and second frame images acquired at different time points in the set of frame images included in the radiographic images, first and second primary component images such that the primary component images each include first component having a reduced noise component, respectively;

a process of generating a second component image including a second component that is different from the first component based on one of the two frame images;

a process of estimating a displacement of the first component based on the two first component images; and a process of generating an interpolation image that corresponds to an acquisition time different from the acquisition times of the two frame images, based on the displacement of the first component of the two first component images and the second component image.

* * * * *